(12) United States Patent
Plachetka et al.

(10) Patent No.: US 11,808,370 B2
(45) Date of Patent: Nov. 7, 2023

(54) MIXING FLUID BY COMBINED AXIAL MOTION AND ROTATION OF MIXING BODY

(71) Applicant: Agilent Technologies, Inc., Santa Clara, CA (US)

(72) Inventors: Clemens Plachetka, Malsch (DE); Manfred Berndt, Karlsruhe (DE); Konstantin Shoykhet, Karlsruhe (DE)

(73) Assignee: Agilent Technologies, Inc., Santa Clara, CA (US)

(*) Notice: Subject to any disclaimer, the term of this patent is extended or adjusted under 35 U.S.C. 154(b) by 439 days.

(21) Appl. No.: 16/929,062

(22) Filed: Jul. 14, 2020

(65) Prior Publication Data
US 2021/0018475 A1 Jan. 21, 2021

(30) Foreign Application Priority Data
Jul. 15, 2019 (GB) .................................... 1910129

(51) Int. Cl.
| | |
|---|---|
| *F16K 29/00* | (2006.01) |
| *F16K 11/00* | (2006.01) |
| *G01N 30/16* | (2006.01) |
| *G01N 30/34* | (2006.01) |
| *G01N 30/80* | (2006.01) |
| *B01F 33/452* | (2022.01) |
| *G01N 30/02* | (2006.01) |
| *B01F 101/23* | (2022.01) |

(52) U.S. Cl.
CPC ............ *F16K 19/00* (2013.01); *B01F 33/452* (2022.01); *F16K 29/00* (2013.01); *G01N 30/16* (2013.01); *G01N 30/34* (2013.01); *G01N 30/80* (2013.01); *B01F 2101/23* (2022.01); *G01N 2030/027* (2013.01); *G01N 2030/347* (2013.01)

(58) Field of Classification Search
CPC .. G01N 30/20; G01N 2030/347; F16K 19/00; F16K 29/00
See application file for complete search history.

(56) References Cited

U.S. PATENT DOCUMENTS

| | | | |
|---|---|---|---|
| 3,823,740 | A | 7/1974 | Arbon |
| 4,175,871 | A | 11/1979 | Erwin et al. |
| 4,496,245 | A | 1/1985 | Conrad et al. |
| 4,531,840 | A | 7/1985 | Clark |

(Continued)

FOREIGN PATENT DOCUMENTS

| | | |
|---|---|---|
| CN | 104813170 A | 7/2015 |
| EP | 1577012 A1 | 9/2005 |

(Continued)

OTHER PUBLICATIONS

Werner, Herb, "Versatile, Ceramic, Metering Pumps for Medical Applications," Fluid Metering Inc, Syosset NY; pp. 1-4.

(Continued)

*Primary Examiner* — Paul M. West

(57) ABSTRACT

A mixer for mixing a mobile phase in a sample separation device for separating a fluidic sample, wherein the mixer includes a fluid inlet for supplying the mobile phase to be mixed to a mixing volume, a movable body configured for rotating and axially moving in the mixing volume to thereby mix the mobile phase, and a fluid outlet for supplying the mixed mobile phase to a mobile phase consumer.

20 Claims, 11 Drawing Sheets

(56) References Cited

U.S. PATENT DOCUMENTS

| | | | |
|---|---|---|---|
| 4,834,545 A | 5/1989 | Inoue et al. | |
| 5,205,647 A | 4/1993 | Ricciardi | |
| 5,488,260 A * | 1/1996 | Heyraud | H02K 1/278 29/598 |
| 5,605,317 A | 2/1997 | Mealy et al. | |
| 5,899,219 A * | 5/1999 | Taube | G05D 11/003 137/7 |
| 6,048,496 A | 4/2000 | Zhou et al. | |
| 6,129,106 A | 10/2000 | Komelson et al. | |
| 9,828,978 B2 | 11/2017 | Middleton et al. | |
| 2002/0112530 A1 * | 8/2002 | Kitagawa | G01N 1/38 73/61.56 |
| 2003/0056842 A1 * | 3/2003 | Sand | B01F 25/312 137/889 |
| 2009/0240072 A1 | 9/2009 | Buck | |
| 2013/0315024 A1 | 11/2013 | Ringgenberg et al. | |
| 2017/0067455 A1 | 3/2017 | Reukers et al. | |
| 2019/0368618 A1 * | 12/2019 | Wei | F16K 1/52 |

FOREIGN PATENT DOCUMENTS

| | | |
|---|---|---|
| FR | 2397224 A1 | 2/1979 |
| JP | S62129134 A | 6/1987 |
| JP | 2002243712 A | 8/2002 |
| SU | 1546125 A1 | 2/1990 |
| WO | 2006109741 A1 | 10/2006 |

OTHER PUBLICATIONS

Aliexpress, "Creative Animal Float Bath Plug," https://www.aliexpress.com/item/1005002939010313.htm; 12 pages.

Chinese Office Action and Search Report dated Jun. 10, 2023 for application No. 202010631030.8; 11 pages.

* cited by examiner

MIXING FLUID BY COMBINED AXIAL MOTION AND ROTATION OF MIXING BODY

RELATED APPLICATIONS

This application claims priority to UK Application No. GB 1910129.4, filed Jul. 15, 2019, the entire contents of which are incorporated herein by reference.

BACKGROUND ART

The present invention relates to a mixer, a mobile phase supply device, a sample separation device, and a method of mixing a mobile phase.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between fluid drive unit and the separation unit for subsequent separation. The accuracy of sample separation also depends sensitively on a correct composition of the mobile phase (which may be composed of different solvents) and on the homogeneity of the mobile phase composition.

Properly mixing a mobile phase with precisely defined composition is difficult.

SUMMARY

It is an object to provide a properly mixed mobile phase, in particular for a sample separation system.

According to an exemplary embodiment of the present invention, a mixer for mixing a mobile phase in a sample separation device for separating a fluidic sample is provided, wherein the mixer comprises a fluid inlet for supplying the mobile phase to be mixed to a mixing volume, a movable body configured for rotating and (in particular simultaneously or consecutively) axially moving in the mixing volume to thereby mix the mobile phase, and a fluid outlet for supplying the mixed mobile phase to a mobile phase consumer.

According to another exemplary embodiment, a sample separation device for separating a fluidic sample in a separation path is provided, wherein the sample separation device comprises a drive unit for driving a mobile phase and the fluidic sample when injected in the mobile phase, a mixer having the above-mentioned features for mixing the mobile phase before injecting the fluidic sample in the mobile phase, and a sample separation unit configured for separating the fluidic sample in the mobile phase.

According to still another exemplary embodiment, a mobile phase supply device for providing a mobile phase is provided, wherein the mobile phase supply device comprises a mixer having the above-mentioned features for receiving and mixing one or more solvents, and a drive unit configured for receiving the mixed one or more solvents from the mixer and for pressurizing the received one or more solvents to be provided as the mobile phase.

According to still another exemplary embodiment, a method of mixing a mobile phase (for example in a sample separation device for separating a fluidic sample) is provided, wherein the method comprises supplying the mobile phase to be mixed to a mixing volume, rotating and (in particular simultaneously or consecutively) axially moving a movable body in the mixing volume to thereby mix the mobile phase, and supplying the mixed mobile phase to a mobile phase consumer.

In the context of the present application, the term "mixer" may particularly denote a mechanism capable of promoting interaction between different fluidic constituents of a mobile phase to thereby increase homogeneity of the mobile phase composed of the individual mixed constituents. In particular, a mixer may trigger mixing of fluids so that previously separated fluid plugs or separated streams may be converted into a more homogeneous mixture in which the individual fluid components are less distinguishable, in particular are completely homogenized.

In the context of the present application, the term "mobile phase" may particularly denote a fluidic mixture (wherein a fluid may be a liquid, a gas, a mixture thereof, optionally comprising solid particles). In particular, a mobile phase may be a solvent composition obtained by the mixing. For example, a first solvent such as water may be mixed with an organic solvent (such as ethanol or acetonitrile).

In the context of the present application, the term "sample separation device" may particularly denote an apparatus capable of separating a fluidic sample into various fractions thereof. The separation of the fluidic sample may be accomplished by introducing the fluidic sample into a flow of said mobile phase and by subsequently separating the fluidic sample into its fractions due to one or more separation criteria. In particular, the sample separation apparatus may be capable of separating the fluidic sample by chromatography (i.e. in view of different affinities of the fractions with regard to a separation medium such as a stationary phase) and/or by electrophoresis (i.e. due to different interactions of the fluidic sample with an electric field).

In the context of the present application, the term "mixing volume" may particularly denote a chamber into which the constituents of the mobile phase are supplied for instance as a sequence of fluid packets or as separate parallel fluid streams and where the actual mixing occurs. Said movable body may be accommodated in the mixing volume to execute a combined rotational and longitudinal motion for promoting mixing between the constituents of the mobile phase.

In the context of the present application, the term "rotating" of the movable body may in particular denote a turning of the movable body around an axis corresponding to a main flowing direction of the mobile phase from the fluid inlet to the fluid outlet.

In the context of the present application, the term "axially moving" may particularly denote a motion of the movable body parallel and/or antiparallel to a main flowing direction of the mobile phase in the mixing volume. For instance, such an axial motion may be a reciprocation of the movable body in the mixing volume.

In the context of the present application, the term "mobile phase consumer" may particularly denote a fluidic member serving as a destination for the produced fluid mixture or mobile phase and configured for further processing the obtained mixture, in particular in terms of sample separation or for another purpose. For example, the consumer may be a fluid drive (such as a high pressure pump) for pressurizing a mobile phase before injection of a fluidic sample into this mobile phase. In another embodiment, such a consumer may be a separation unit (such as a chromatographic separation column) to which the mobile phase is transported as a transport medium for the fluidic sample. A stationary phase of the sample separation unit may be configured for absorbing the fluidic sample and for subsequently releasing fractions of the fluidic sample from the separation unit (for instance in terms of a gradient mode or an isocratic mode). Also an injector or sampler injecting a fluidic sample in the mobile phase may be such a mobile phase consumer.

According to an exemplary embodiment of the invention, a mixer for mixing a fluid for forming a mobile phase is provided which supplies the fluid components to be mixed (for instance as a sequence of serial fluid plugs and/or as parallel flows of separate streams) into a mixing volume and to trigger or promote mixing into a homogeneous mobile phase by a combined rotational and longitudinal motion of a movable body in the mixing volume. Thus, one and the same movable body may both rotate and move axially for promoting mixing of the constituents of the mobile phase. For this purpose, a combined rotation and longitudinal motion of the movable body may be carried out at the same time or simultaneously. It is however also possible that a rotation and longitudinal motion of the movable body may be executed sequentially, for instance as an alternating sequence of a rotation-only-motion and a longitudinal-only-motion of the movable piston. It has turned out that a combination of a linear motion and a turning motion of the movable body particularly efficiently promotes the mixing process and therefore allows obtaining a highly homogeneous mobile phase at the fluid outlet. With a very simple but efficient mechanism, mixing of even very small fluid volumes provided at even very high pressure may thus be achieved. Not only the simple mechanism and the high efficiency of the mixing, but additionally a high accuracy and precision of the obtained mixture in terms of fluid composition may be ensured. This is of utmost importance for a high accuracy and reproducibility of sample separation using the mixed mobile phase.

In the following, further embodiments of the mixer, the mobile phase supply device, the sample separation device, and the method will be explained.

In an embodiment, the movable body is a rotationally symmetric body, in particular a cylinder body (see for instance FIG. 2). Providing a rotationally symmetric body may ensure an efficient mixing due to an interaction between the mobile phase and the cylinder body along a large interaction area. For instance, a cylindrical movable body with a circular cross-section may be particularly able to both reciprocate and rotate in the mixing volume with substantially no dead volume. However, the movable body may also have different shapes, in particular may be a disk body (see FIG. 18 to FIG. 22) or a combined cylinder-disk body (see FIG. 25).

In an embodiment, the valve body is configured for selectively opening or closing the flow path by being actuated by an axial movement. Hence, the movable body may fulfil a double function, i.e. mixing mobile phase and opening and closing the valve.

In an embodiment, the valve body is configured for being actuated by the mobile phase. Thus, the mobile phase itself may create the force for operating the movable body.

In an embodiment, at least part of a surface, in particular at least part of a lateral surface, of the movable body has a structured (in particular micro-structured) surface configured for promoting mixing the mobile phase when interacting with the mobile phase. Such a structured surface may have a surface profile (in case of a microstructured surface with indentations and protrusions having dimensions in the order of magnitude of micrometers) which has turned out as an efficient mechanism for increasing homogeneity of the mixed mobile phase. For instance, the structured surface may be a roughened surface with an arbitrary arrangement of indentations and protrusions which has turned out as an efficient mixing surface. Alternatively, it is also possible to provide a defined or ordered surface profile (for instance an arrangement of helical grooves in order to promote mixing in a particularly defined way). Additionally or alternatively, a radial bearing surrounding the movable body and delimiting the mixing volume may be equipped with such a structured surface to further increase the mixing performance.

In an embodiment, the movable body is at least partially made of a magnetic material, in particular of a permanent magnetic material, so as to be rotatable and axially movable by a magnetic drive force. When the movable body is, partially or entirely, made of a (preferably permanent) magnetic material, motion of the movable body both in a linear and rotating way may be efficiently triggered in a contactless way by a magnetic drive unit. By taking this measure, it is also possible to locate the magnetic drive unit or any coupling structures for coupling with such a magnetic drive unit outside of the mixing volume so that the dead volume can be further reduced in the mixing process is not disturbed by the drive mechanism. However, as an alternative to a magnetic drive mechanism, it is also possible to drive the movable body by a mechanic coupling with a drive shaft supporting both reciprocation and rotation of the movable body.

In an embodiment, the magnetic material of the movable body is embedded in non-magnetic material of the movable body. By embedding the magnet in the non-magnetic portion of the movable body, the magnetic material may be protected against mechanical damage during operation of the mixer. Furthermore, the magnetic material may be decoupled from the (in some cases chemically aggressive) mobile phase. Integrating the magnetic material in the for instance rod-shaped or disk-shaped movable body may also keep the dead volume small.

In an embodiment, the mixer comprises a void in the non-magnetic material adjacent to the magnetic material. When a magnet material is inserted into an interior hollow space of the non-magnetic portion of the movable body, different densities, etc. of the resulting movable body may have an impact on the weight distribution within the movable body. To equilibrate asymmetries or inhomogeneities of such a weight distribution, formation of a further or remaining hollow portion within the movable body may be advantageous. The shape and dimension of such a remaining hollow space may be a design parameter for adjusting the precise properties of the mixer.

In an embodiment, the magnetic material is configured so that its polarity shifts from north to south along a radial axis of the movable body. With such a configuration of the north and south poles of the permanent magnet material of the movable body, it is possible in a simple way to trigger both rotation and reciprocation with a magnetic drive unit surrounding the movable body.

In an embodiment, the mixer comprises a magnetic drive unit configured for exerting a magnetic force to the movable body so as to rotate and axially move the movable body. Such a magnetic drive unit may be configured for generating a magnetic field, thus exerting a magnetic force acting on the movable body in the mixing volume. Advantageously, a corresponding magnetic drive mechanism may function in a contactless manner, i.e. without physical contact between the at least partially magnetic movable body on the one hand and the magnetic drive unit on the other hand.

In an embodiment, the magnetic drive unit comprises at least one magnetic coil around the movable body. A coil surrounding the movable body and being arranged preferably outside of the mixing volume around an exterior housing delimiting the mixing volume allows to efficiently trigger motion of the movable body both in a linear direction and a circumferential direction while keeping the dead volume small. For initiating a motion of the movable body, it is sufficient to simply apply an electric current with an appropriate time dependency thereof to the magnetic drive unit being preferably configured as one or more magnetic coils. Additionally or alternatively, the magnetic drive unit may comprise at least one permanent magnetic body, which may for instance be moved or which may be static to exert a magnetic force at the position of the movable body.

In an embodiment, the fluid inlet comprises a fluid splitter configured for splitting the supplied mobile phase to flow around the movable body to thereby promote mixing. When the mobile phase to be mixed—for instance a sequence of plugs of mobile phase or parallel streams of solvents—is supplied to one or more inlet ports of the mixer's fluid inlet, splitting the fluid flow into separate fluid streams or splitting the fluid flow from a substantially circular cross-section to a substantially hollow cylindrical cross-section may allow to further enhance the mixing effect.

In an embodiment, the fluid outlet comprises a fluid combiner configured for combining the mixed split mobile phase (for instance circumferentially flowing around a lateral surface of the movable body) to a combined stream with continuous cross-section. Thus, downstream of the movable body and upstream of the fluid outlet, the previously split flow may be combined again into a single stream flowing to the consumer for consuming or further processing of the mixed mobile phase.

In an embodiment, the movable body is arranged in the mixing volume in such a manner that the mobile phase flows around a lateral surface of the movable body between at least part of a path between fluid inlet and fluid outlet. Descriptively speaking, mobile phase flowing through the fluid inlet may be split directly upstream of the movable body and may flow along a substantially hollow cylindrical path around the lateral surface of the movable body. Directly upstream of the fluid outlet, the split circumferential flow may be combined so as to flow as a fully cylindrical flow stream out of the fluid outlet.

In an embodiment, the movable body is configured for rotating around an axis of its axial movement. Additionally or alternatively, it is also possible that the movable body is configured for axially moving by reciprocating along the axis of its axial movement.

In an embodiment of the mobile phase supply device, the mixer is configured as active inlet valve of the drive unit. In particular, the mixer may function as active inlet valve for a high pressure pump of a sample separation apparatus, for instance a liquid chromatography apparatus.

In an embodiment, the mixer comprises a feedback channel (which may also be denoted as a backward channel) for feeding back the mobile phase after mixing in the mixing volume (in particular back towards the fluid inlet or back to an additional fluid outlet). In one embodiment, such a configuration may extend the functionality of the mixer to a combined mixer-pump pumping the mixed mobile phase back to an additional fluid outlet (see for example FIG. 11). In another embodiment, the feedback channel may be used for circulating the mobile phase after mixing in the mixing volume, in particular so as to be continuously mixed in the mixing volume multiple times (see for example FIG. 2). Highly advantageously, one or more feedback channels may be formed which may guide the (at least partially) mixed mobile phase back from the fluid outlet towards the fluid inlet or towards a further fluid outlet. Thus, a mobile phase may be introduced once again into the mixing volume for repeating or intensifying mixing. Additionally or alternatively, it may be possible to pump the mixture to a destination outside of the mixer. By implementing a feedback channel, it is thus possible to introduce a pump function in the mixer. In such a configuration, a valve at the fluid outlet may be closed so that fluid being mixed in the mixing volume may flow back along the feedback channel in a direction towards the fluid inlet. Mixed fluid may then be pumped towards a destination or consumer via said further fluid outlet.

In an embodiment, the mixer comprises an inlet ball valve at the fluid inlet. For instance, the inlet ball valve may be configured as an active valve or as a passive valve. In particular when embodied as a passive valve, opening and closing of the inlet ball valve may be triggered by the pressure of the mobile phase. In particular when embodied as an active valve, opening and closing of the inlet ball valve may be triggered by the motion of the movable body which may exert an opening or closing force on the inlet ball valve.

In an embodiment, the mixer comprises an outlet ball valve at the fluid outlet. For instance, the outlet ball valve may be configured as an active valve or as a passive valve. In particular when embodied as a passive valve, opening and closing of the outlet ball valve may be triggered by the pressure of the mobile phase. In particular when embodied as an active valve, opening and closing of the outlet ball valve may be triggered by the motion of the movable body which may exert an opening or closing force on the outlet ball valve.

In an embodiment, at least one of the inlet ball and the outlet ball is actuable by the movable body to promote cleaning of the inlet ball or the outlet ball. This may be accomplished by pressing the movable body against a respective valve ball in combination with a rotation of the movable body when in contact with the inlet ball or the outlet ball. Hence, the movable body may be driven towards a respective valve ball at the fluid inlet or at the fluid outlet and may press the respective valve ball against an assigned seat. In such a configuration, rotation of the movable body may also cause rotation of the respective ball seated in the respective seat. This forced motion of the ball in the seat under pressure exerted by the movable body may allow removing solid deposits from the respective valve ball for cleaning the latter.

In an embodiment, at least one of the inlet ball and the outlet ball is fixedly connected with the movable body. This keeps the number of movable parts small and thus the construction simple.

In an embodiment, at least one of the inlet ball and the outlet ball is provided separately from the movable body. The respective ball may then move independently from the movable body.

In an embodiment, at least one of the inlet ball and the outlet ball is movable in an axial direction by the movable body. In particular, a reciprocation of the movable body may press the respective ball in a respective valve seat.

In an embodiment, at least one of the inlet ball and the outlet ball is movable in an axial direction by the mobile phase. Thus, the mobile phase itself may create a force for moving the ball in accordance with a desired valve function.

In an embodiment, at least one of the inlet ball and the outlet ball is configured to cooperate with a conical seat of the movable body. This may promote a self-cleaning of the respective ball.

In an embodiment, at least one of the inlet ball and the outlet ball is configured to cooperate with a spherical seat of the movable body. Such a configuration may also involve a nutational motion of the movable body, to thereby further increase the efficiency of the mixing.

In an embodiment, the mixer comprises at least one sealing, in particular at least one high-pressure sealing, at the fluid inlet and/or at the fluid outlet. By providing such a sealing at an inlet side and/or an outlet side of the mixing volume, it can be ensured that the mixer is fluid-tight even at high pressures of at least 100 bar, in particular of at least 1000 bar, which makes the mixer particularly appropriate for high pressure sample separation.

In an embodiment, the movable body is configured as a valve body operable for selectively opening or closing a flow path of mobile phase through the fluid inlet, along the mixing volume and through the fluid outlet. Thus, the movable body may be configured for selectively opening or closing a fluidic path between the fluid inlet and the fluid outlet. According to such an embodiment, a mixer may be embodied as a combined mixer-valve-arrangement, wherein the valve is opened or closed by the movable body when reciprocating in the longitudinal axial direction. By such a controlled motion, the movable body may for instance actuate an inlet valve ball or an outlet valve ball to move the respective valve ball into a ball seat or out of the ball seat. Hence, the movable body may fulfil a double function, i.e. may serve as mixing agent and valve body at the same time.

In an embodiment, the mixer comprises at least one guide blade on the movable body (in particular at a lateral surface thereof) configured for interacting with the mobile phase. Such at least one guide blade may serve for promoting mixing of the mobile phase, because it may enhance a turbulent flow. Additionally or alternatively, such at least one guide blade may also be configured for being moved by the mobile phase to thereby promote rotation of the movable body. For instance, a rotation of the movable body may be a result of an interaction of mobile phase with the at least one guide blade when the movable body is axially moving. By providing one or more guide blades on the lateral surface of the movable body may enable the movable body to function in a similar way as a turbine. When mobile phase flows along the movable body and interacts with the one or more guide blades, the mobile phase may generate a rotating force on the movable body. In such an embodiment, it may be possible that the movable body is only actively forced to carry out a (in particular reciprocating) axial motion, and the rotation of the movable body is caused by the interaction of the one or more correspondingly designed guide blades interacting with the mobile phase. Additionally or alternatively, a radial bearing surrounding the movable body and delimiting the mixing volume may be equipped with at least one guide blade.

In an embodiment, the movable body is configured for carrying out a nutational movement or for pivoting relative to an axial direction. The axial direction may be defined by a virtual connection line between fluid inlet and fluid outlet. Pivoting the movable body may involve bearing one end of the movable body (for instance in a ball bearing) to thereby enable only rotation and reciprocation of said end. The opposing other end of the movable body may be allowed to move in addition also radially along a circular trajectory so that the rigid movable body as a whole carries out a pivoting motion in addition to the rotation and reciprocation. By adding a pivoting motion to the axially moving and rotating movable body may add a further degree of freedom of motion to thereby allow to further refine the function of the movable body, for instance in terms of mixing and/or providing a valve function.

In an embodiment of the sample separation device, the mixer is located upstream or downstream of the drive unit. In one embodiment, the mixer may be arranged downstream of a proportioning unit (in particular a proportioning valve) and upstream of a fluid drive unit such as a high pressure pump. The proportioning unit may have a plurality of fluidic inputs each configured for receiving a respective component of the mobile phase to be mixed, for instance a solvent component. By switching the proportioning valve, a sequence of the various fluid components may be created at the outlet of the proportioning unit, wherein the individual fluid components may be serially arranged as solvent plugs. By arranging a mixer downstream of this proportioning unit, the sequence of plugs may be mixed into a homogeneous mobile phase. Such a homogeneous mobile phase may then be supplied to a fluid drive unit downstream of the mixer for pressurizing the mobile phase before being supplied to a separation unit or an injector for injecting the fluidic sample into the mobile phase. Additionally or alternatively, it is also possible to arrange a mixer downstream of said fluid drive unit so that the pressurized mobile phase may be further mixed by the mixer.

In an embodiment, the fluid drive unit is configured for compressing the mobile phase, in particular up to a pressure of at least 500 bar, more particularly of at least 1500 bar, even more particularly of at least 1200 bar. Hence, the fluid drive unit may be capable of operating as a high pressure pump, in particular for high pressure liquid chromatography applications.

In an embodiment, an injector (which may be located downstream of the fluid drive unit) for injecting the fluidic sample to be separated into the mixed mobile phase comprises a needle and a seat configured for accommodating the needle. The needle may be drivable towards a sample container for intaking fluidic sample into a sample accommodation volume by a corresponding operation of a metering pump or other type of sample drive. The needle may be configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of the sample drive (such as a metering pump) may be driven in a backward direction to thereby intake a certain amount of fluidic sample from the sample container via the needle into the sample accommodation volume. Thereafter, the needle may be driven back into the seat to establish a fluid-tight connection there. By switching a fluidic valve of the injector into an injection switching state, the intaken fluidic sample may be injected from the sample accommodation volume into the mobile phase provided by the mixer, so that the fluidic sample and the mobile phase may be driven towards the separation unit.

In an embodiment, the sample drive or metering device of the injector comprises a piston configured for moving in opposite directions when intaking fluidic sample (which may involve a backward motion of the piston) and when injecting fluidic sample into the separation path pressing the fluidic sample towards the separation unit in the injection switching state. The piston may be mounted for reciprocating in a piston chamber of the sample drive. For drawing or intaking fluidic sample into the sample accommodation volume, the piston may be moved backwardly so as to draw fluidic sample from a sample container through a needle into the sample accommodation volume.

Embodiments of the above described fluidic valve may be implemented in conventionally available HPLC systems, such as the Agilent 1200 Series Rapid Resolution LC system or the Agilent 1150 HPLC series (both provided by the applicant Agilent Technologies—see www.agilent.com.

One embodiment of a sample separation device comprises a pumping apparatus as fluid drive unit having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties.

The separation unit of the sample separation device preferably comprises a chromatographic column (see for instance the website article en.wikipedia.org/wiki/Column_chromatography) providing a stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive unit, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under www.agilent.com.

Embodiments of the invention can be partly or entirely embodied or supported by one or more suitable software programs, which can be stored on or otherwise provided by any kind of data carrier (such as, e.g., a non-transitory computer-readable or machine-readable medium), and which might be executed in or by any suitable data processing unit or control unit (such as, e.g., a computing device comprising one or more electronics-based processors, memories, and the like as appreciated by persons skilled in the art). Software programs or routines can be preferably applied in or by the control unit.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
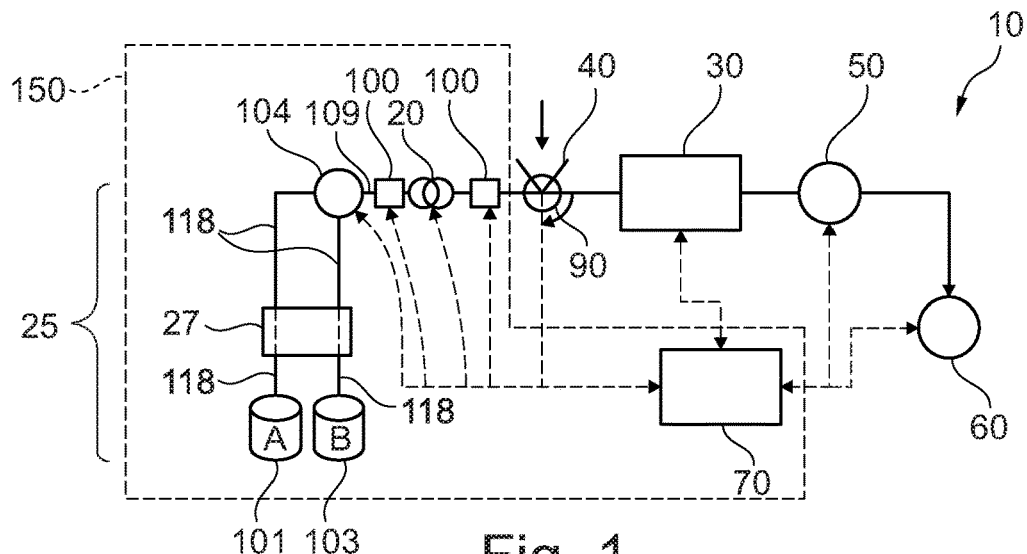
FIG. 1 shows a liquid sample separation device in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, a mixer may be provided which has a movable body which, in addition to a reciprocating axial motion, experiences also a rotation to promote mixing of constituents of the mobile phase. Optionally, the movable body may also be tilted or pivoted around the axial direction, to further refine the mixing. In an embodiment, fracture mixture may simultaneously also fulfill a valve function. Thus, the movable body operating in such a way may function as a combined mixer-valve-arrangement. When the movable body moves towards a fluid inlet, it may close the fluid inlet, for instance by actuating an inlet ball and forcing the inlet ball into a valve seat at the fluid inlet. By taking this measure, the fluid inlet may be selectively closed. By moving in the opposite direction, the movable body may allow the inlet ball to be opened so that mobile phase can flow through the fluid inlet and along the movable body. Optionally, it is also possible to provide an outlet ball valve at the fluid outlet so that the movable body can also be operated to act on the outlet valve ball.

Advantageously, the movable body may also be operated so as to press the inlet ball towards a seat at the fluid inlet or to press the outlet ball towards a seat at the fluid outlet. In this pressing state, the movable body may then be additionally rotated so as to also rotate the inlet ball in the seat at the fluid inlet or the outlet ball at the seat at the fluid outlet. By taking this measure, a solid deposit on the respective inlet ball or outlet ball may be removed by the friction force between inlet ball or outlet ball on the one hand and the respective seat and movable body on the other hand. Thus, the movable body may also contribute to the cleaning of the inlet ball and/or outlet ball. For instance, the inlet ball and/or outlet ball may be made of a sufficiently rigid material such as sapphire or ruby so as to prevent damage of the respective inlet ball or outlet ball during this frictional cleaning caused by the movable body. In an embodiment, it is possible to configure a seat for the inlet ball or outlet ball with a conical shape and with a sharp angle so that the inlet ball or outlet ball may be rotated with pressure applied by the movable body at the seat so as to remove debris from the respective inlet ball or outlet ball.

In an advantageous embodiment, it is also possible to provide one or more guide blades at the circumferential or lateral surface of the for instance rod-shaped or disk-shaped movable body, and/or on a cooperating surface of a radial bearing surrounding the movable body and defining a mixing volume. Thus, mobile phase flowing through the mixing volume may exert a force on the guide blades, for instance a rotating force. Thus, it may be sufficient to drive the mobile phase through the mixer and to promote an axial motion (in particular a reciprocation) of the movable body in the mixing volume, so that the driven mobile phase may cause, via the one or more correspondingly designed guide blades, the movable body to rotate.

When an optional outlet ball is provided in addition to an inlet ball, an abutment of the mixer-valve-arrangement may be created at both the fluid inlet and the fluid outlet in order to properly define a stroke volume. The provision of an inlet ball and/or an outlet ball may prevent metal-metal collisions which might damage or reduce the lifetime of the mixer.

In order to drive the movable body in the mixing volume with a magnetic drive mechanism, it may be possible to provide one or more coils at an exterior of the mixing volume. By applying a respective time-dependent magnetic field profile to the coil (or more precisely a time-dependent current function or voltage function) force contributions may be created resulting in an axial motion and a rotation, and optionally also a pivoting, of the movable body. In this context, the magnetic material of the movable body may for instance be ferrite or a permanent magnetic material. It is however alternatively also possible to provide a plurality of coils around the mixing volume. For instance, two coils spaced by a permanent magnetic structure may be an advantageous selection. For instance, magnetically driving the movable body in the mixing volume may be accomplished with a shaded pole motor. Descriptively speaking, a magnetic field created by a coil or the like may have a constant offset value which may result in a longitudinal motion of the movable body in the axial direction. A time-dependent, for instance oscillating, additional magnetic field generated by the coil may promote rotation of the movable body. Such a time-dependent magnetic field having a constant offset and a time-dependent contribution may be accomplished by providing a single or multiple combined coil structure.

As an alternative to a magnetic drive, it may also be possible to drive the movable body by an ultrasonic drive or by a mechanical motor (such as electric motor). It is also possible to accomplish rotation of the movable body (and optionally also longitudinal motion) by blades on the lateral surface of the movable body, in combination with a moving force of mobile phase.

According to an exemplary embodiment of the invention, an active inline mixer for a chromatographic sample separation device (such as a HPLC) with low dead volume may be provided.

Conventionally, mixing is either done passively using static structures or by inducing a rotating propeller-like structure. A shortcoming of such conventional approaches is the necessity of an additional rotational sealing for attaching a motor which is at the low-pressure side with the mixer in the high-pressure side. This may lead to additional volume and possible leakages and modes of failure.

Advantageously, a magnetic system of a mixer according to an exemplary embodiment of the invention may generate a rotating field which rotates a for instance piston-shaped movable body along its axial axis. Due to an optional microstructure on a lateral surface of the movable body and/or an opposing bearing surface, fluid of the mobile force may be actively twirled and pumped into or out of the pump chamber defining a mixing volume. With an optional additional backward-channel, the complete liquid in the chamber where the movable body is attached to can circulate through the mixer. As the for instance piston shaped movable body can also be moved axially, it may enhance the mixing effect.

Referring now in greater detail to the drawings, FIG. 1 depicts a general schematic of a liquid separation system as example for a sample separation device 10 according to an exemplary embodiment of the invention. A pump as fluid drive unit 20 receives a mobile phase from a solvent supply 25, typically via a degasser 27, which degases and thus reduces the amount of dissolved gases in the mobile phase. The mobile phase drive or fluid drive unit 20 drives the mobile phase through a separation unit 30 (such as a chromatographic column) comprising a stationary phase. A sampler or injector 40, implementing a fluidic valve 90, can be provided between the fluid drive unit 20 and the separation unit 30 in order to subject or add (often referred to as sample introduction) a sample fluid into the mobile phase so that a mixture of fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing may be provided at low pressure upstream of the fluid drive unit 20 and/or at high pressure downstream of the fluid drive unit 20 by one or more mixers 100. It is possible that the fluid drive unit 20 comprises plural individual pumping units, with plural of the pumping units each receiving and pumping a different solvent or mixture, so that the mixing of the mobile phase (as received by the separation unit 30) occurs at high pressure and downstream of the fluid drive unit 20 (or as part thereof). The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the fluid drive unit 20 (for example setting control parameters) and receive therefrom information regarding the actual working conditions (such as output pressure, etc. at an outlet of the pump). The control unit 70 may also control operation of the solvent supply 25 (for example setting the solvent/s or solvent mixture to be supplied) and/or the degasser 27 (for example setting control parameters such as vacuum level) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive unit 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) which provides data back.

FIG. 1 also shows a liquid supply device 150 configured for metering liquids in controlled proportions and for supplying a resultant mixture as mobile phase. The liquid supply device 150 comprises in the shown example two reservoirs 101, 103 each containing a respective solvent component A (in this example water), B (in this example a buffer, i.e. salt dissolved in a solvent). Moreover, it is possible to provide one or more additional reservoirs, for instance an additional reservoir comprising an organic solvent, a further reservoir comprising an optional organic modifier, etc. Each of the reservoirs 101, 103 is fluidically connected via a respective liquid supply line 118 with a proportioning unit 104 which may be configured as proportioning valve. The proportioning unit 104 is configured to connect a selected one of the liquid supply lines 118 with a supply line 109 guiding towards the fluid drive unit 20, and to switch between different liquid supply lines 118. The supply line 109 is connected with an inlet of the fluid drive unit 20. Hence, solvent blending is performed at the low-pressure side of the fluid drive unit 20 by metering or proportioning a sequence of fluidic portions.

In the fluid supply system 150, the proportioning unit 104 is hence configured for proportioning multiple solvent components A, B for composing the mobile phase. The fluid drive unit 20 is here configured for driving the solvent components A, B of the mobile phase along the fluidic conduits and through the fluidic members shown in FIG. 1.

As shown in FIG. 1, a mixer 100 can be arranged for example downstream of the proportioning unit 104 and upstream of the fluid drive unit 20 and/or downstream of the fluid drive unit 20 and upstream of the injector 40. The mobile phase composed of the various solvents A, B may then be homogeneously mixed before supplied to the fluid drive unit 20 and/or before being supplied to the injector 40. At an outlet of the proportioning unit 104, the mobile phase may be present as a sequence of subsequently or serially arranged separate solvent plugs. Possible configurations of the mixer 100 illustrated in FIG. 1 only schematically will be described in the following referring to FIG. 2 to FIG. 27.

Figure 2:
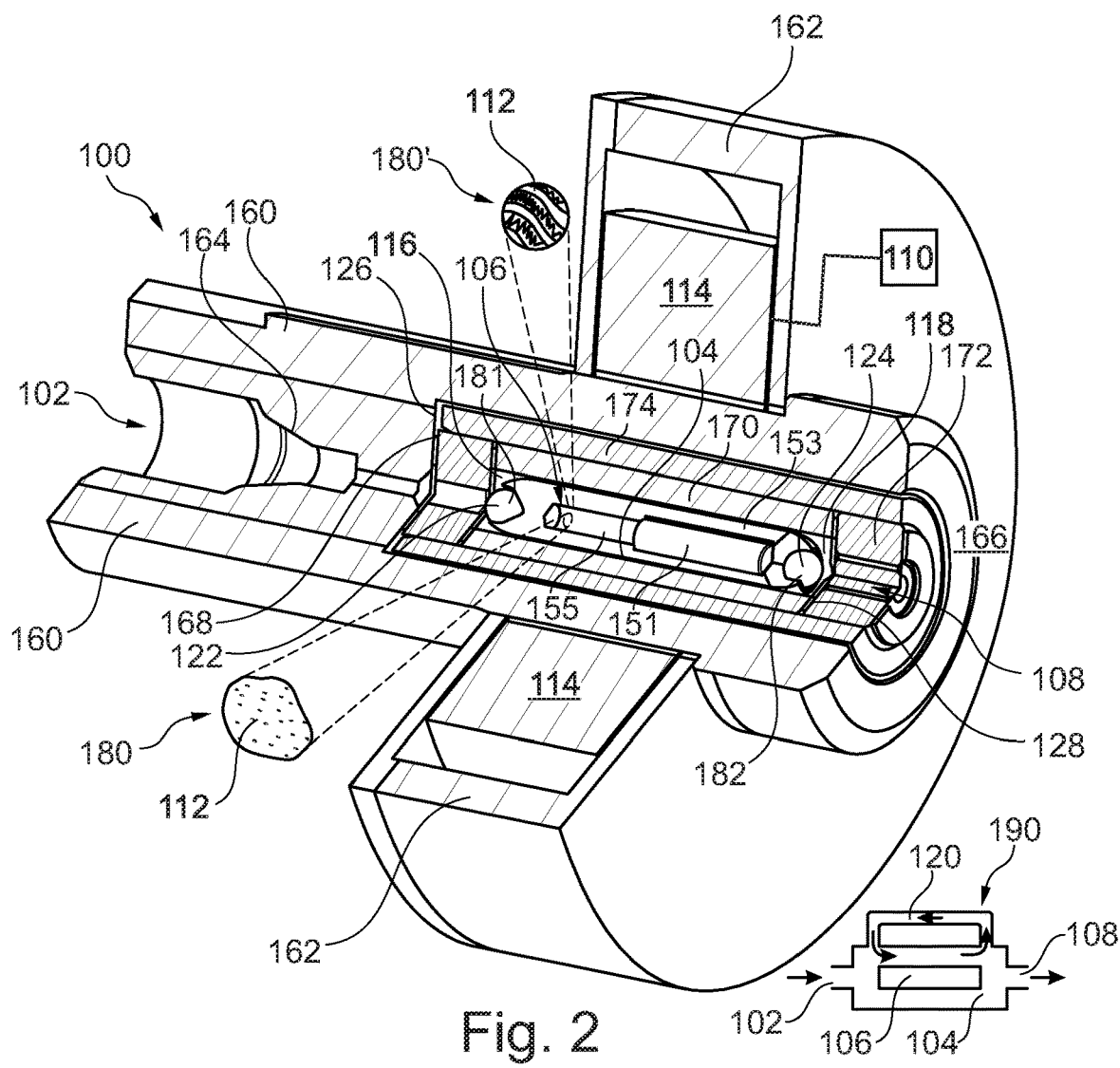
FIG. 2 illustrates a three-dimensional cross-sectional view of a mixer of a sample separation apparatus according to an exemplary embodiment of the invention.
Figure 3:
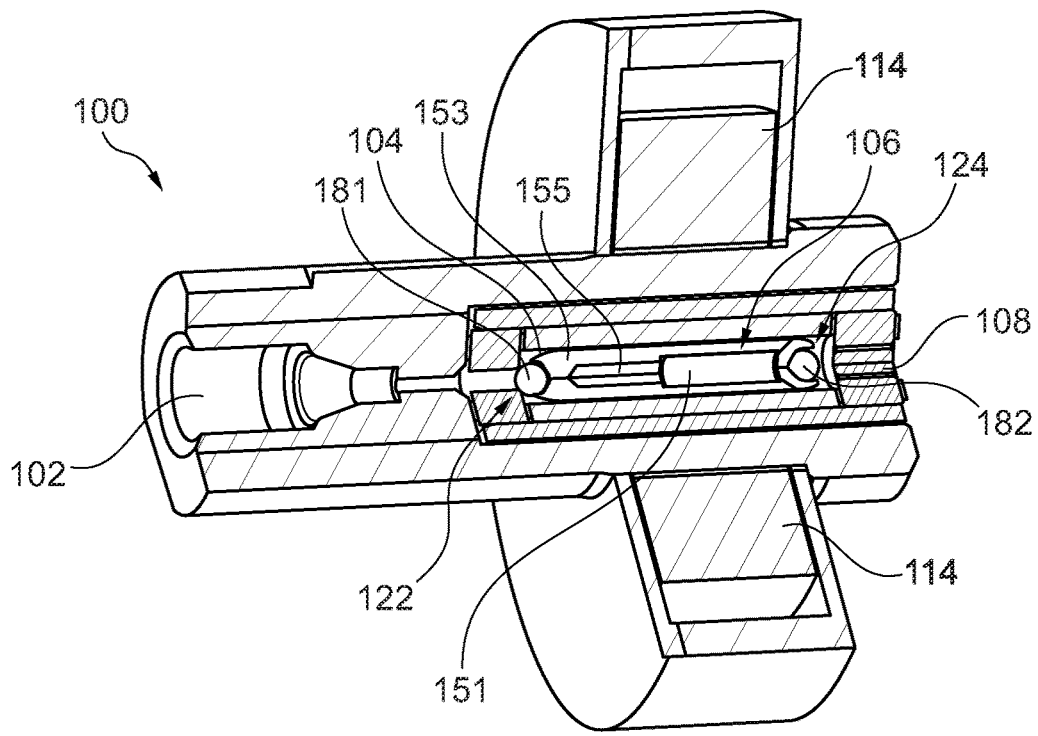
FIG. 3 shows another three-dimensional cross-sectional view of the mixer according to FIG. 2.

FIG. 2 illustrates a three-dimensional cross-sectional view of a mixer 100 according to an exemplary embodiment of the invention. FIG. 3 shows another three-dimensional cross-sectional view of the mixer 100 according to FIG. 2.

The mixer 100 illustrated in FIG. 2 and FIG. 3 is configured for mixing a mobile phase (for instance a solvent composition, for instance composed of water and an organic solvent such as methanol), for example in the sample separation device 10 according to FIG. 1.

The constituents of the mobile phase to be mixed may be supplied at a fluid inlet 102 to a mixing volume 104. A piston-shaped or rod-shaped movable body 106 is accommodated in the mixing volume 104 and is configured for both rotating around a central axis (corresponding to an axis between fluid inlet 102 and fluid outlet 108) and axially moving (in particular reciprocating in the mixing volume 104 to thereby mix the mobile phase). Thus, a combined rotation and reciprocation motion of the movable body 106 may trigger efficient mixture of the constituents of the mobile phase supplied via fluid inlet 102. In the embodiment of FIG. 2 and FIG. 3, the movable body 106 is a rotationally symmetric cylinder (other shapes are however possible, for instance a disk shape as shown in FIG. 18 to FIG. 22). As shown schematically in details 180, 180', at least part of a lateral surface of the movable body 106 may have a microstructured surface 112 for promoting mixing the mobile phase when interacting with the mobile phase.

The movable body 106 may comprise a core of a magnetic material 151 (for instance permanent magnetic material or ferromagnetic material), so as to be rotatable and axially movable by a magnetic drive force. For example, the magnetic material 151 is configured so that its polarity shifts from north to south along a radial axis of the movable body 106. The magnetic material 151 is embedded in non-magnetic material 153 of the movable body 106, so that the sensitive magnetic material 151 is shielded from the (potentially aggressive) mobile phase. The non-magnetic material 153 forms a shell of the movable body 106 and may also enclose an empty interior void 155, for instance for the purpose of weight equilibration.

A magnetic drive unit 114, which may be powered by an electric power source 110, is foreseen and is arranged surrounding the movable body 106 for exerting a magnetic force to the movable body 106 so as to trigger both rotation and axial motion of the movable body 106. In particular, the magnetic drive unit 114 may comprise one or more magnetic coils arranged around the movable body 106. A constant or time-dependent current may be applied to the one or more coils to thereby generate a constant or time-dependent magnetic field for correspondingly moving and rotating the movable body 106 by exerting a magnetic force to the movable body 106 caused by the electric current flowing through the one or more coils.

At the fluid inlet 102, a fluid splitter 116 is formed which is configured for splitting the supplied mobile phase provided as a radially central continuous stream into separate flow streams flowing around the movable body 106 to thereby promote mixing.

Furthermore, a fluid outlet 108 is provided for providing the mixed mobile phase for further processing. For instance, the mixed mobile phase may be supplied to a mobile phase consumer such as fluid drive unit 20, the injector 40 or the separation unit 30 shown in FIG. 1. At the fluid outlet 108, a fluid combiner 118 is formed which is configured for combining the mixed mobile phase flowing along the lateral surface of the movable object 106 into a radially central continuous stream to thereby further promote mixing.

Optionally, a feedback channel 120, shown in a detail 190, may be provided for circulating the mobile phase after mixing in the mixing volume 104 back towards the fluid inlet 102 so as to be continuously mixed in the mixing volume 104 multiple times. This may further improve the mixing performance.

In addition to its fluid mixing function, the mixer 100 may also function as a valve. For this purpose, an inlet ball valve 122 may be formed at the fluid inlet 102. The inlet ball valve 122 may be composed of a valve ball 181 and a corresponding seat for accommodating valve ball 181. Additionally, an outlet ball valve 124 is formed at the fluid outlet 108. The outlet ball valve 124 may be composed of a further valve ball 182 and a further corresponding seat for accommodating further valve ball 182. A high pressure sealing 126, 128 may be formed both at the fluid inlet 102 and at the fluid outlet 108 when the respective valve ball 181, 182 is forced into the assigned seat. Opening or closing the inlet ball valve 122 and the outlet ball valve 124 may be accomplished by a corresponding actuation of movable body 106 and/or mobile phase driven through mixer 100. Thus, the correspondingly driven movable body 106 and/or mobile phase under pressure may force the respective valve ball 181, 182 to be accommodated sealingly in the assigned seat for closing the respective valve. The respective valve is opened, when the respective valve ball 181, 182 is not forced to rest in its seat.

Moreover, mixer 100 comprises an exterior housing 160 accommodating all constituents delimiting mixing volume 104 and movable body 106 rotating and reciprocating with mixing volume 104. Furthermore, a magnetic drive housing 162 is arranged to partially surround housing 160 for accommodating one or more coils of magnetic drive unit 114 therein.

FIG. 2 shows that the mixer 100 additionally comprises a first fluidic interface 164 configured for connecting a fluidic member serving as the mobile phase source, for instance a fitting (not shown) connected via tubing (not shown) with an outlet of a proportioning unit 104 or a fluid drive unit 20 (see FIG. 1). The mixer 100 has a second fluidic interface 166 configured for fluidically coupling a mobile phase consumer (for instance drive unit 20, injector 40 or separation unit 30 in the configuration illustrated in FIG. 1) to the fluid outlet 108.

Fluid inlet 102 can be a high pressure inlet configured for receiving constituents of the mobile phase at a high pressure of at least 100 bar, in particular of at least 1000 bar. Correspondingly, inlet sealing 126 can be configured as a high pressure sealing layer for instance made on the basis of a PEEK (polyetheretherketone) foil. An axial bearing with the flow splitter or fluid splitter 116 is illustrated in FIG. 1 with reference numeral 168. The fluid splitter 116 is provided for flow distribution (for instance implementing different hole sizes) and for premixing. Furthermore, a radial bearing 170 is provided which circumferentially encloses the mixing volume 104 and can be made for instance of a ceramic material. At the fluid outlet 108, high pressure outlet sealing 128 is arranged which can be made from a PEEK foils as well for supporting high pressure sealing. Reference numeral 172 denotes a further axial bearing with the flow combiner 118. Tubing 174 supports a cartridge design of the mixer 100 and may be capable or configured for pre-pressurizing the radial bearing 170.

Figure 26:
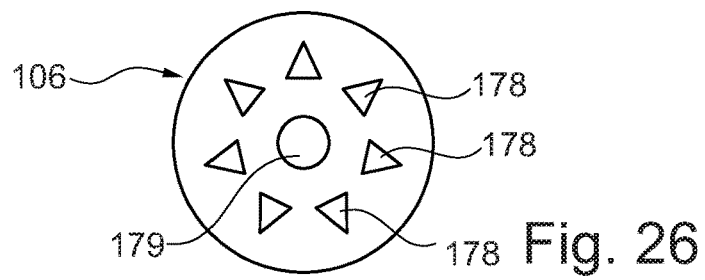
FIG. 26 is a plan view of a movable body with guide blades according to another exemplary embodiment of a mixer.
Figure 27:
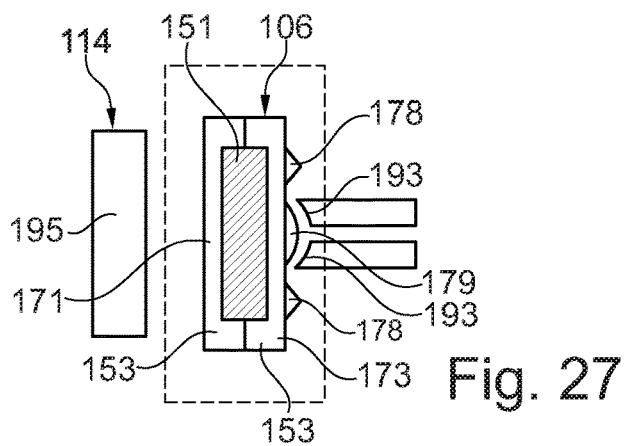
FIG. 27 illustrates a cross-sectional view of the movable body according to FIG. 26 together with valve components and a drive unit.

As shown in FIG. 2, the movable body 106 may be configured as a piston with integrated magnet and the structured surface 112 (optionally with guide blades 178, see for instance FIG. 26 and FIG. 27). Different configurations of the structured surface 112 are possible. As shown in a detail 180, the structured surface 112 may have a random or arbitrary pattern of dimples and spikes which promote mixing. As shown in a further detail 180', it is also possible that the structured surface 112 is provided with a defined arrangement of structural features, such as a helical groove promoting mixture in a well-defined way without the formation of excessive vortices or turbulence. Axial bearing balls 181, 182 may form part of a respective (for instance passive) inlet and outlet ball valve 122, 124. The permanent magnetic material 151 of the movable body 106 may form an internal magnetic system, for instance as an embedded magnet coated with a shock absorbing and chemical resistant material in form of non-magnetic material 153. By taking this measure, the magnetic movable body 106 may be rendered compatible with aggressive chemicals which may form part of the mobile phase. Thus, the surface of the movable body 106 may be rendered chemically inert and, if desired or required, biocompatible. The magnetic material of the movable body 106 may be configured so as to have a horizontal orientation in a way that, along its radial axis, the polarity of the magnetic material shifts from north (N) to south (S). The housing 160 may serve as a casing for accommodating the various mentioned components, hydraulic plugs, threads, etc. The magnetic drive unit 114 may be configured as an external magnetic system, for instance comprising one or more coils to which an electric current may be applied. Housing 162 serves for accommodating the magnetic system or magnetic drive unit 114.

During operation, a series of subsequent solvent plugs can be supplied to the fluid inlet 102 of the mixer 104. By linear forward motion of the piston type movable body 106 towards a right-hand side of FIG. 2, inlet ball valve 122 opens and sucks the constituents of the mobile phase through fluid inlet 102 into mixing volume 104. Combined reciprocation and rotation of the piston type movable body 106 with its structured surface 112 promotes mixing of the various constituents of the mobile phase. This mixing performance is further enhanced by the flow splitting function of the fluid splitter 116. Feedback channel 120 may circulate the mixed mobile phase once or multiple times so that it is mixed a number of times in the mixing volume 104. After the mixing procedure is completed, the mixed mobile phase flows through the fluid outlet 108 towards a connected consumer, such as fluid drive unit 20 or injector 40. The combined reciprocating and rotating motion of movable body 106 is accomplished by a correspondingly applied electric current flowing through the coil(s) of the magnetic drive unit 114. The outlet ball valve 124 may be opened passively by the reciprocation of the movable body 106.

The magnetic drive unit 114 generates a rotating magnetic field which rotates the movable body 106 along its central axis. Due to the structured surface 112 of the movable body 106, the mobile phase to be mixed is actively twirled and pumped into or out of the mixing volume 104. With the above-mentioned feedback channel 120, the complete liquid in the mixing volume 104 can circulate through the mixer 100. As the movable body 106 can also move axially, its combined rotating and reciprocating motion enhances the mixing effect in an efficient way.

Still referring to FIG. 2, the movable body 106 may comprise said magnetic material 151 being embedded in non-magnetic material 153, for instance in a non-magnetic shell (for example made of stainless steel). The magnetic material 151 may for instance be a permanent magnetic material or ferrite. As described above, the movable body 106 may be reciprocated in the longitudinal direction of the mixing volume 104 and may be rotated about the axial direction by the magnetic drive unit 114. By embedding the magnetic material 151 within the non-magnetic shell of non-magnetic material 153, any damage of the magnetic material 151 when colliding with other materials in the mixing volume 104 may be prevented. Moreover, any direct contact between a chemically aggressive mobile phase and the magnetic material may thus be prevented. Embedding the magnet material 151 in the shell of non-magnetic material 153 may also keep the dead volume small.

As can be taken from FIG. 2, the magnetic material 151 is embedded in a hollow volume within the non-magnetic material 153. However, a hollow space or void 155 in the interior of the non-magnetic material 153 also remains after inserting the magnetic material 151 in the non-magnetic material 153. The design of the remaining hollow volume or void 155 may be selected so as to equilibrate an undesired weight distribution within the movable body 106.

The mobile phase entering the mixer 100 via fluid inlet 102 may be a circular cylindrical flow. When reaching the front end of the movable body 106, the mobile phase may be split into a circumferential hollow cylindrical flow flowing around the cylindrical lateral surface of the movable body 106. In the embodiment of FIG. 2, the movable body 106 is shaped as a rod or oblong circular cylinder. When reaching the back end of the movable body 106, the circumferentially split flow can be again combined so as to flow out as a circular cylindrical flow through fluid outlet 108.

Figure 4:
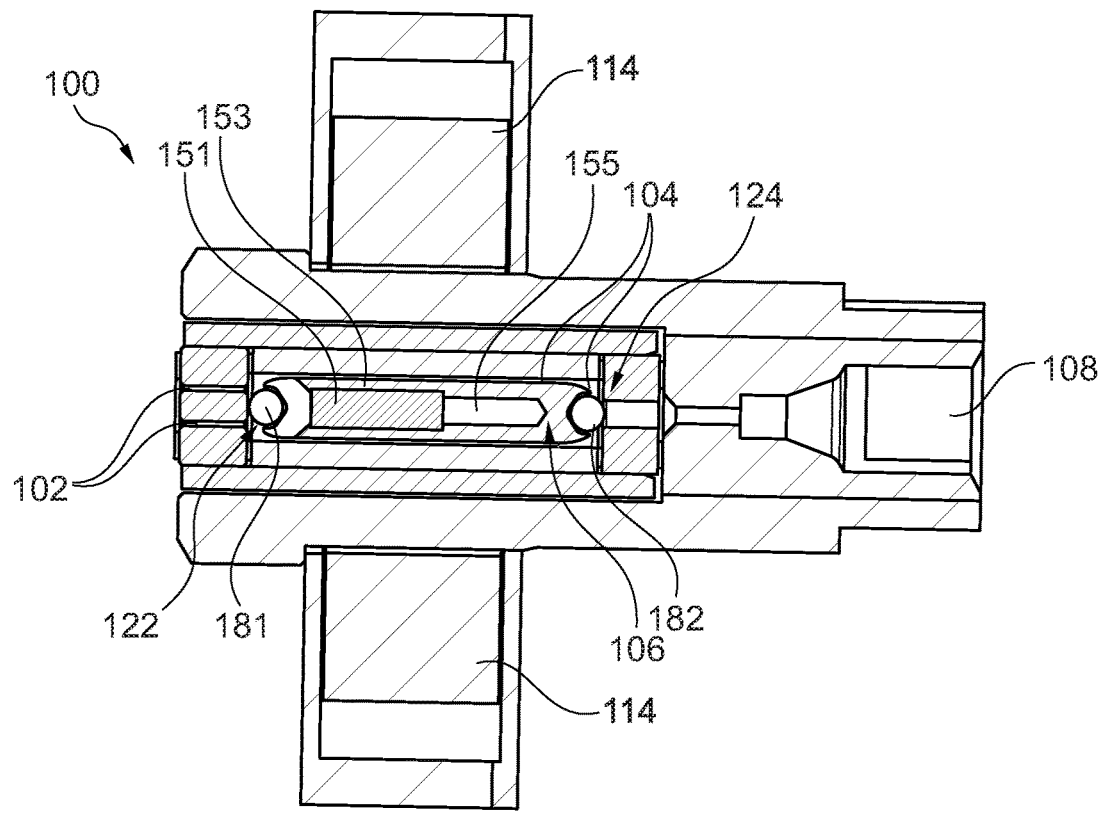
FIG. 4 shows a cross-sectional view of a mixer according to another exemplary embodiment of the invention with a conical ball seat on the inlet side and on the outlet side.

FIG. 4 shows a cross-sectional view of a mixer 100 according to another exemplary embodiment of the invention in which movable body 106 is provided with a conical ball seat both on the inlet side and on the outlet side. FIG. 4 thus shows a mixer 100 with a valve configuration having a conical ball seat both on the side of the fluid inlet 102 as well as on the side of the fluid outlet 108. An advantage of such an embodiment is that the valve balls 181, 182 can move freely during actuation and can thus be surrounded by fluid from each side. This may prevent an undesired formation of a single seat position which may promote accommodation of dirt on the valve balls 181, 182. An angle of the conical seats may be selected so that the respective valve ball 181, 182 can be properly separated from its assigned seat and does not stick to the seat. The valve balls 181, 182 are thus allowed to rotate which provides a self-cleaning function.

Figure 5:
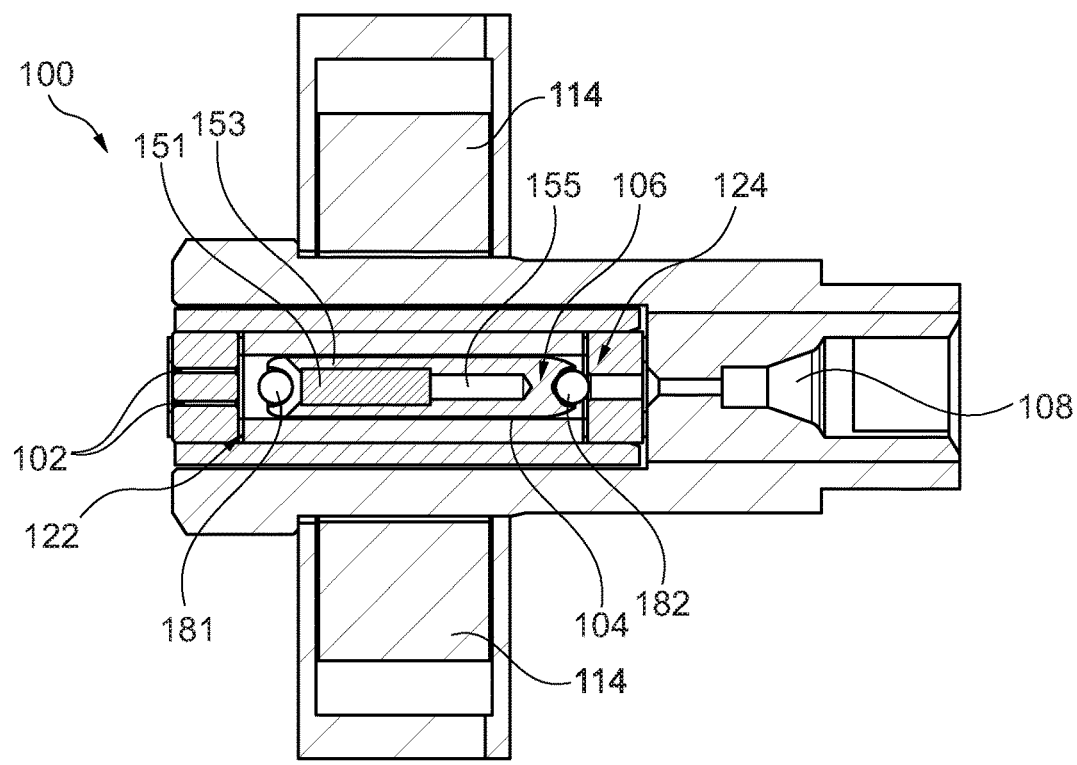
FIG. 5 shows a cross-sectional view of a mixer according to still another exemplary embodiment of the invention with a conical ball seat only on the outlet side.

FIG. 5 shows a cross-sectional view of a mixer 100 according to still another exemplary embodiment of the invention in which movable body 106 is provided with a conical ball seat only on the outlet side, i.e. at valve ball 182 adjacent to fluid outlet 108. Hence, a difference between the embodiment of FIG. 4 and the embodiment of FIG. 5 is that, in the embodiment of FIG. 5, only valve ball 182 is accommodated in a conical seat. In contrast to this, valve ball 181 has a spherical rather than conical seat in the movable body 106 and can thus be fixed with the movable body 106.

Figure 6:
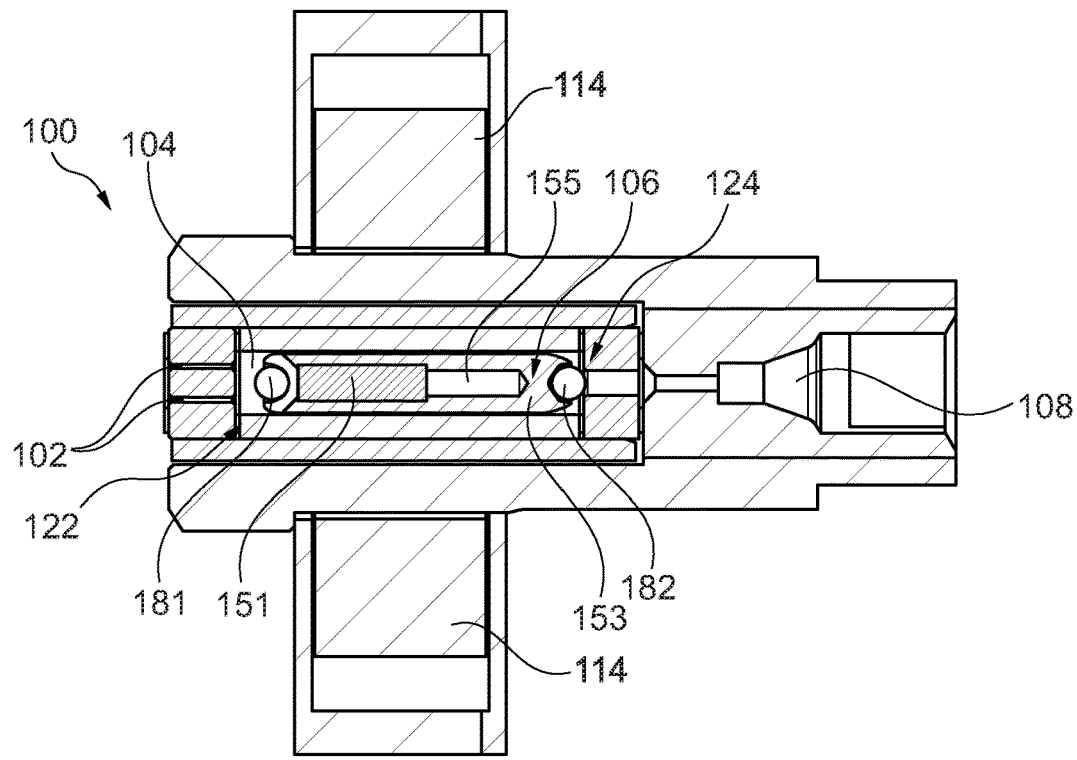
FIG. 6 shows a cross-sectional view of a mixer according to yet another exemplary embodiment of the invention with fixed valve balls.

FIG. 6 shows a cross-sectional view of a mixer 100 according to yet another exemplary embodiment of the invention with fixed valve balls 181, 182. Hence, a difference between the embodiment of FIG. 5 and the embodiment of FIG. 6 is that, according to the embodiment of FIG. 6, both valve balls 181, 182 are accommodated in a fixed spherical seat in movable body 106.

Figure 7:
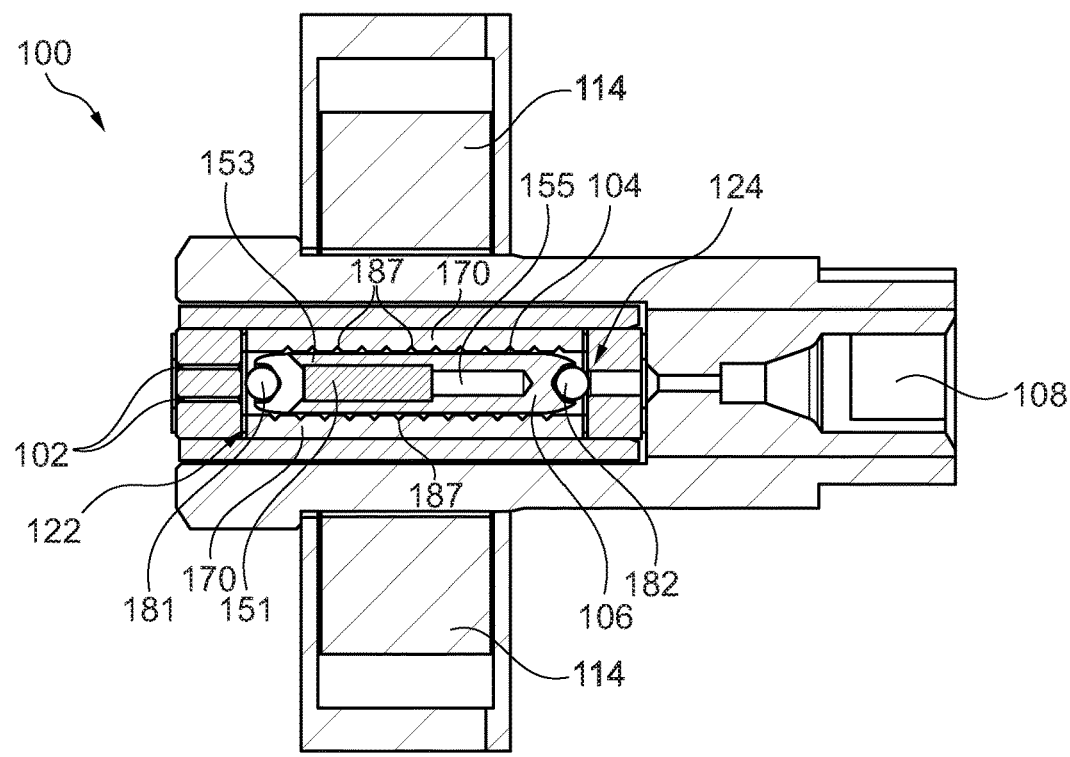
FIG. 7 shows a cross-sectional view of a mixer according to still another exemplary embodiment of the invention with a mixing promoting profile at a lateral surface of a radial bearing surrounding a movable body.

FIG. 7 shows a cross-sectional view of a mixer 100 according to still another exemplary embodiment of the invention with a mixing promoting profile 187 at a lateral surface of radial bearing 170 surrounding movable body 106. More precisely, radial bearing 170 delimiting the mixing volume 104 and accommodating the movable body 106 may have an inner circumferential surface which is provided with a surface profile 187. For instance, the surface profile 187 may be formed as a helical groove in the inner circumferential surface. Additionally or alternatively to the formation of the surface profile 187 on the inner circumferential surface of the radial bearing 170, the movable body 106 may or may not be provided with such a surface profile or structured surface (see for instance reference numeral 112 in FIG. 2 and FIG. 11). This may improve the mixing performance in the mixing volume 104 between the movable body 106 and the radial bearing 170.

Figure 8:
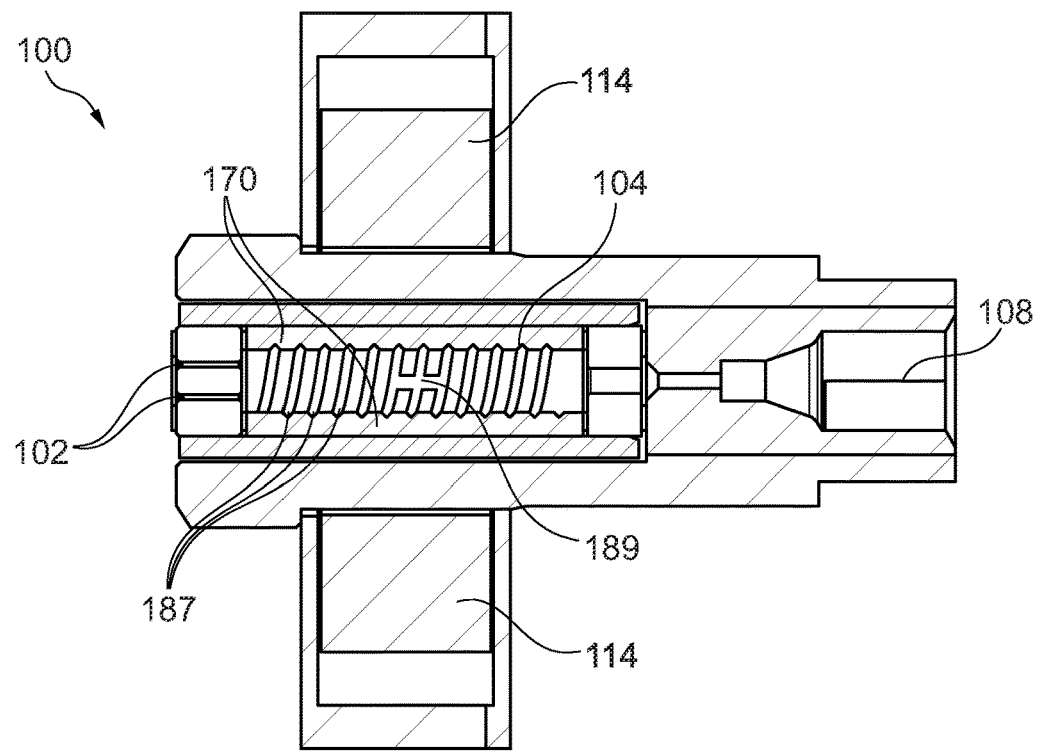
FIG. 8 shows a cross-sectional view of part of a mixer according to yet another exemplary embodiment of the invention with a mixing profile at a lateral surface of a radial bearing for surrounding a movable body, the mixing profile having cross connected profile structures for promoting mixing.

FIG. 8 shows a cross-sectional view of part (movable body 106 is not shown) of a mixer 100 according to yet another exemplary embodiment of the invention with a mixing profile 187 at a lateral surface of radial bearing 170 surrounding a movable body 106. The mixing profile 187 has cross connected profile structures 189 for further promoting mixing. As indicated with reference numeral 189, adjacent sub-structures (for instance windings) of the mixing profile 187 may be connected to one another, for instance by forming an axial connection groove as in FIG. 8. Descriptively speaking, this may create additional mixing performance and may therefore improve axial mixing. Cross connected profile structures 189 may be created on the inner circumferential surface of the radial bearing 170 (as in FIG. 8) and/or on the exterior circumferential surface of the movable body 106 (where for example sub-structures of structured surface 112 may be interconnected).

Figure 9:
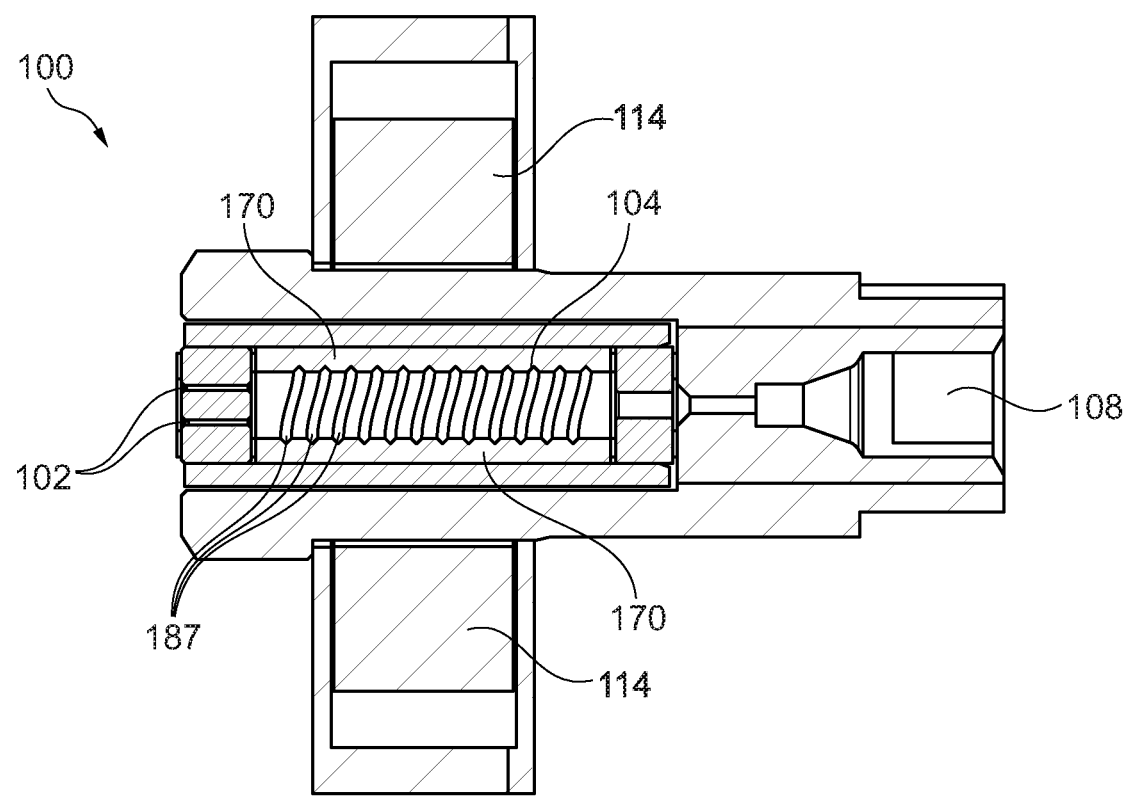
FIG. 9 shows a cross-sectional view of a mixer according to still another exemplary embodiment of the invention with guide blades on a lateral surface of a radial bearing surrounding the movable body.

FIG. 9 shows a cross-sectional view of a part of a mixer 100 according to still another exemplary embodiment of the invention with guide blades, as surface profile 187, on a lateral surface of radial bearing 170 surrounding the movable body 106 (not shown in FIG. 9). The embodiment of FIG. 9 differs from the embodiment of FIG. 8 in that, according to FIG. 9, interconnections or cross connected profile structures 189 are omitted. In other words, the mixing profile 187 on the circumferential inner surface of the radial bearing 170 forms a continuous helical structure according to FIG. 9. However, the illustrated mixer-valve arrangement with blade geometry does not necessarily have to be continuous, but may be alternatively discontinuous.

Figure 10:
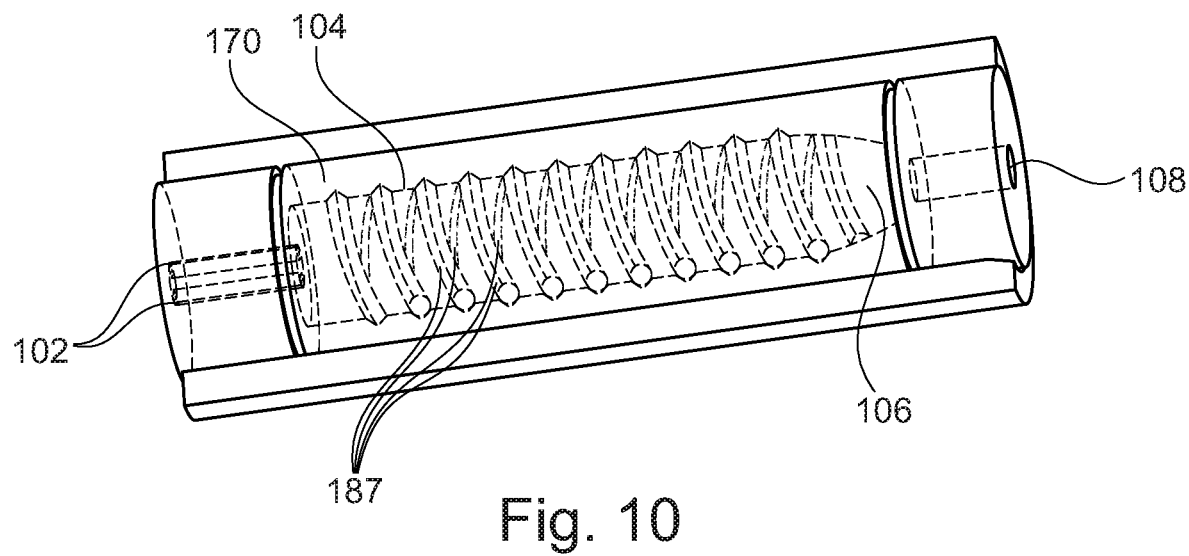
FIG. 10 shows a three-dimensional view of a portion of a mixer according to yet another exemplary embodiment of the invention around a movable body with a mixing profile on the lateral surface of the movable body.

FIG. 10 shows a three-dimensional view of a portion of a mixer 100 according to yet another exemplary embodiment of the invention around a movable body 106 with a mixing profile 187 both on the lateral surface of the movable body 106 and on an inner circumferential surface of radial bearing 170. Thus, a surface profile, structured surface or mixing profile 187 may be formed on both cooperating main surfaces of movable body 106 and radial bearing 170 for further improving the mixing performance of mixer 100. In a preferred configuration, the mixing profile 187 may be formed as a left-hand thread on one of the movable body 106 and the radial bearing 170 and as a right-hand thread on the other one of the movable body 106 and the radial bearing 170. It is also possible that the thread pitch (for instance the axial distance between adjacent windings) on the movable body 106 and the radial bearing 170 is different. In addition to the improved mixing performance, taking such measures may also create a rotation of the movable body 106 when moved in an axial direction (for instance in a reciprocating manner). Hence, forming a mixing profile 187 on both cooperating main surfaces of movable body 106 and radial bearing 170 may improve the mixing performance, may center the piston shaped movable body 106 and may promote the self-cleaning friction motion of the respectively moved balls 181, 182 on its ball seat.

Figure 11:
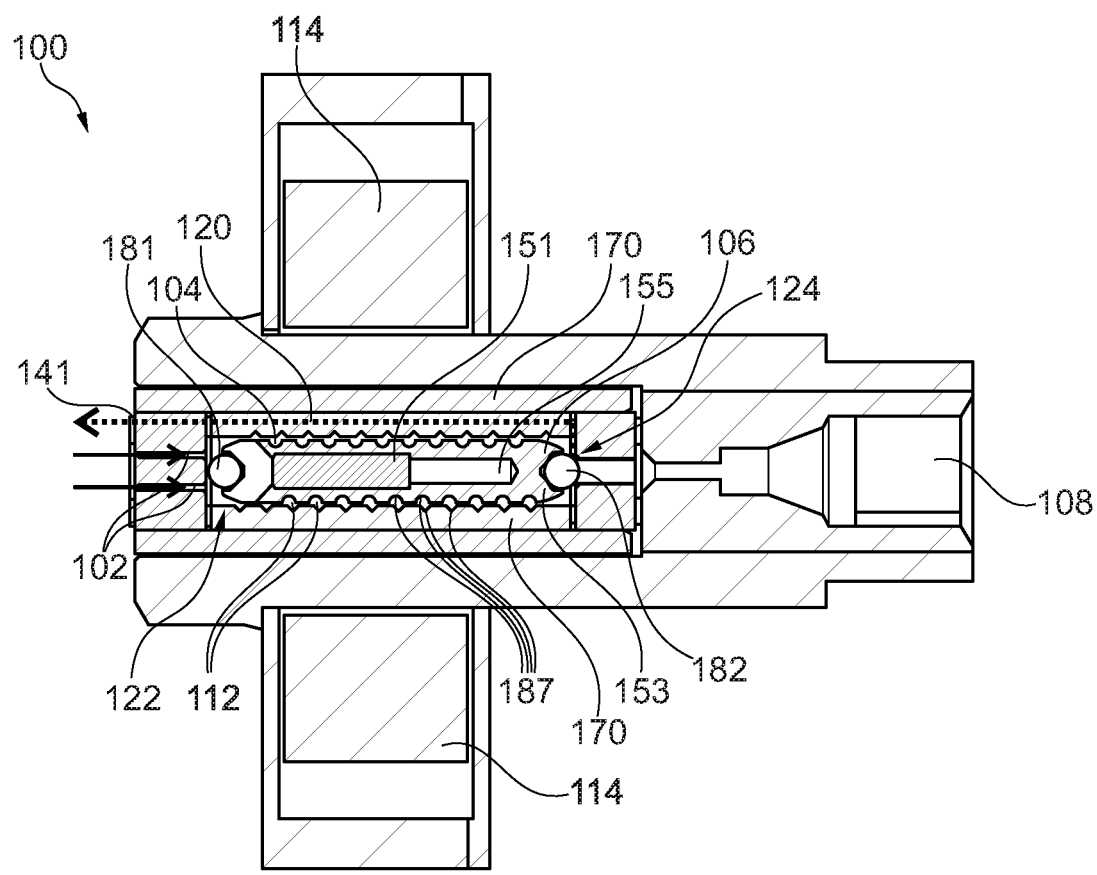
FIG. 11 shows a cross-sectional view of a mixer according to still another exemplary embodiment of the invention in which a valve ball is in a seat on the right-hand side when the corresponding valve is closed.

FIG. 11 shows a cross-sectional view of a mixer 100 according to still another exemplary embodiment of the invention in which valve ball 182 is in a seat on the right-hand side when the valve is closed.

In the embodiment of FIG. 11, a surface profile 187 is again formed on both cooperating surfaces of movable body 106 and of radial bearing 170. Such a surface profile 187 may also involve the formation of one or more guide blades (compare reference numeral 178 in FIG. 19 to FIG. 22, FIG. 26 and FIG. 27).

Moreover, in the configuration of FIG. 11, when the valve is closed, valve ball 182 on the right-hand side is sealingly located in its seat. Closing the valve may for instance be accomplished by supplying mobile phase at fluid inlet 102 with a sufficient pressure, for instance at least 20 bar. In this closed valve state, the mobile phase will be mixed in the mixing volume 104 and will then flow back along feedback channel 120 through additional outlet 141 of mixer 100, for instance towards a consumer or the like. Thus, a pumping functionality can be incorporated in the mixer 100, which may thus function as a mixer-valve-pump-arrangement of an exemplary embodiment of the invention. For instance, feedback channel 120 may be formed in radial bearing 170.

The piston shaped movable body 106 can freely rotate due to its conical bearing. If a rotating magnetic field is applied, the guide blade geometry of the piston shaped movable body 106 may be used to provide the function of a micro-rotation pump. For instance in terms of an HPLC application, this means that, if the valve is closed, the mobile phase may be aspirated by rotation of the movable body 106 via fluid inlet 102. In the mixing volume 104, the mobile phase can be actively mixed. The separate feedback channel 120 may transport back the mixed mobile phase to additional fluid outlet 141. Aspirating and feedback channel function can be changed to provide a push-out function and a flow-in channel function by inverting the rotation direction of the movable body 106.

Figure 12:
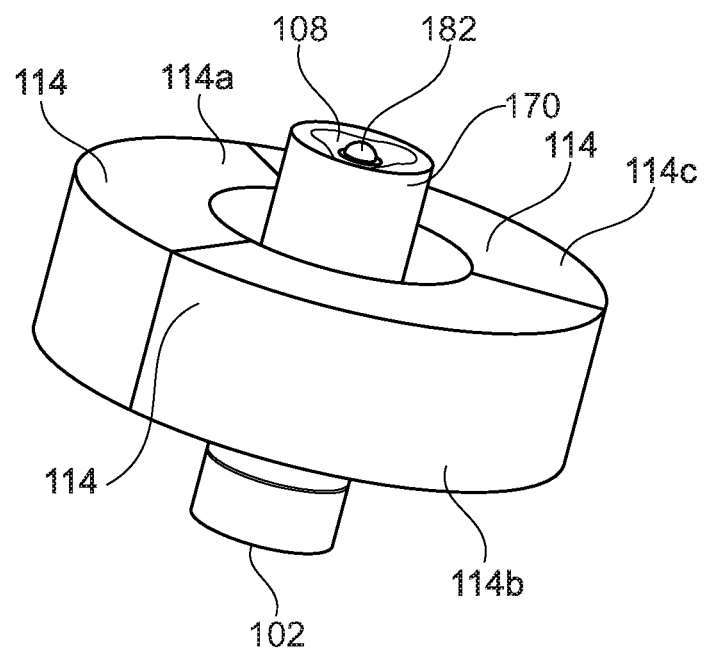
FIG. 12 shows a three-dimensional view a portion of a mixer according to still another exemplary embodiment of the invention with a nutation based mixing architecture.
Figure 13:
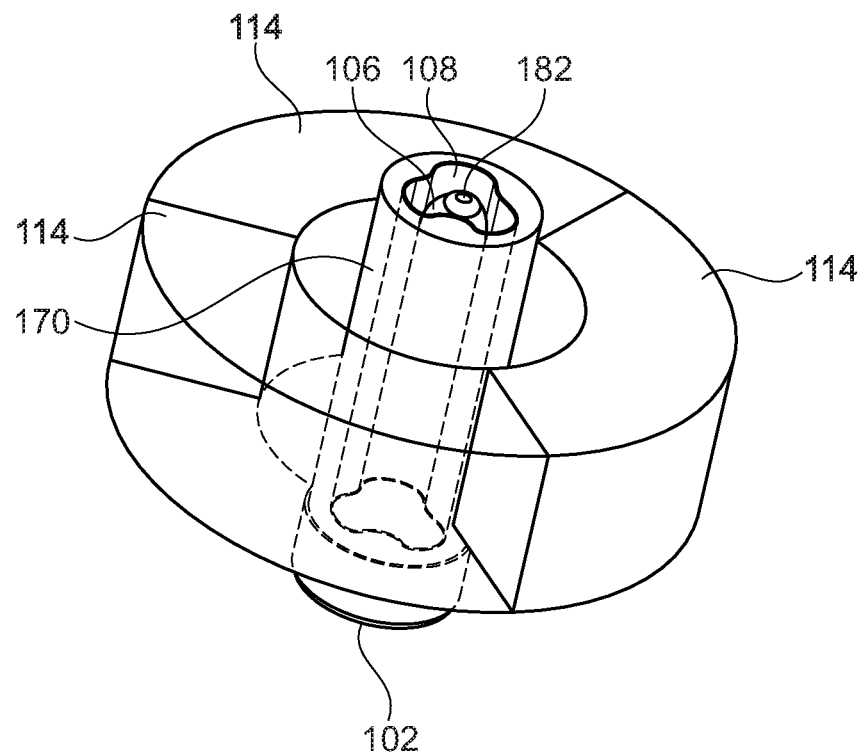
FIG. 13 shows another three-dimensional view of the portion of the mixer illustrated in FIG. 12.
Figure 14:
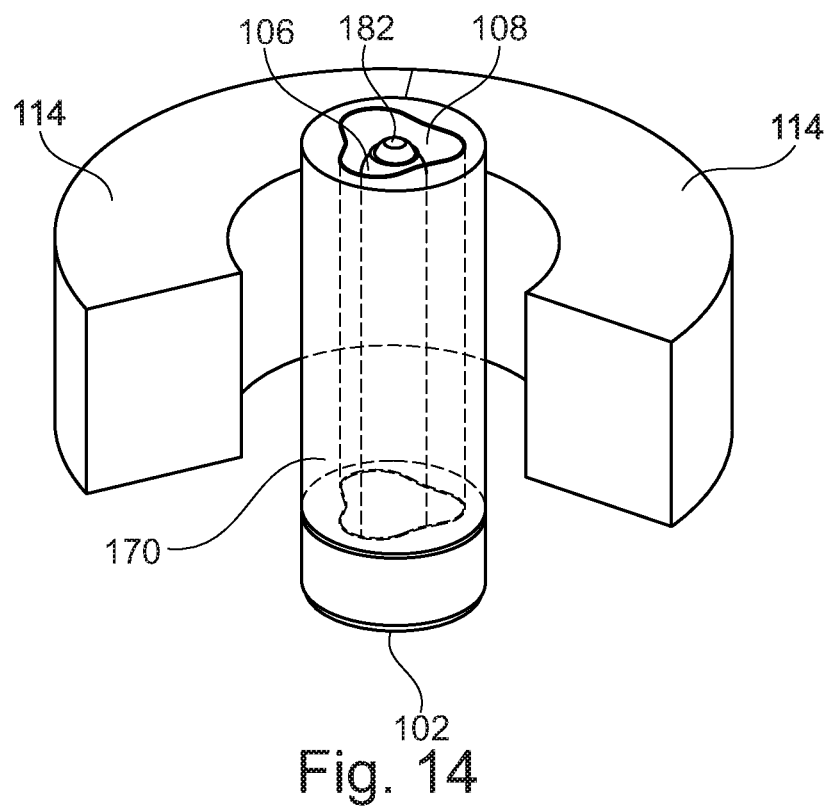
FIG. 14 shows another three-dimensional view of the portion of the mixer illustrated in FIG. 12.
Figure 15:
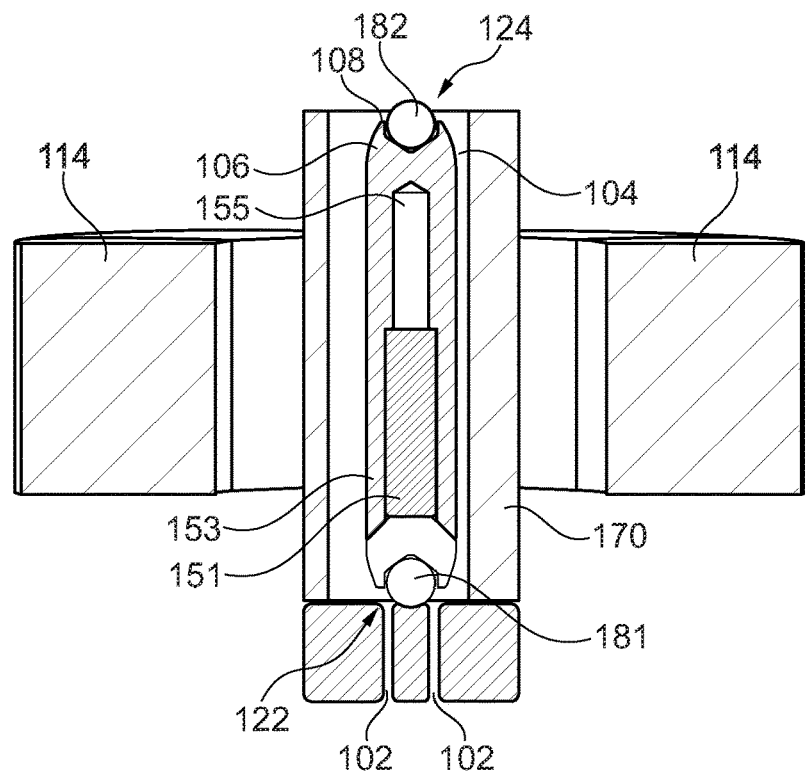
FIG. 15 shows a cross-sectional view the portion of of the mixer illustrated in FIG. 12.
Figure 16:
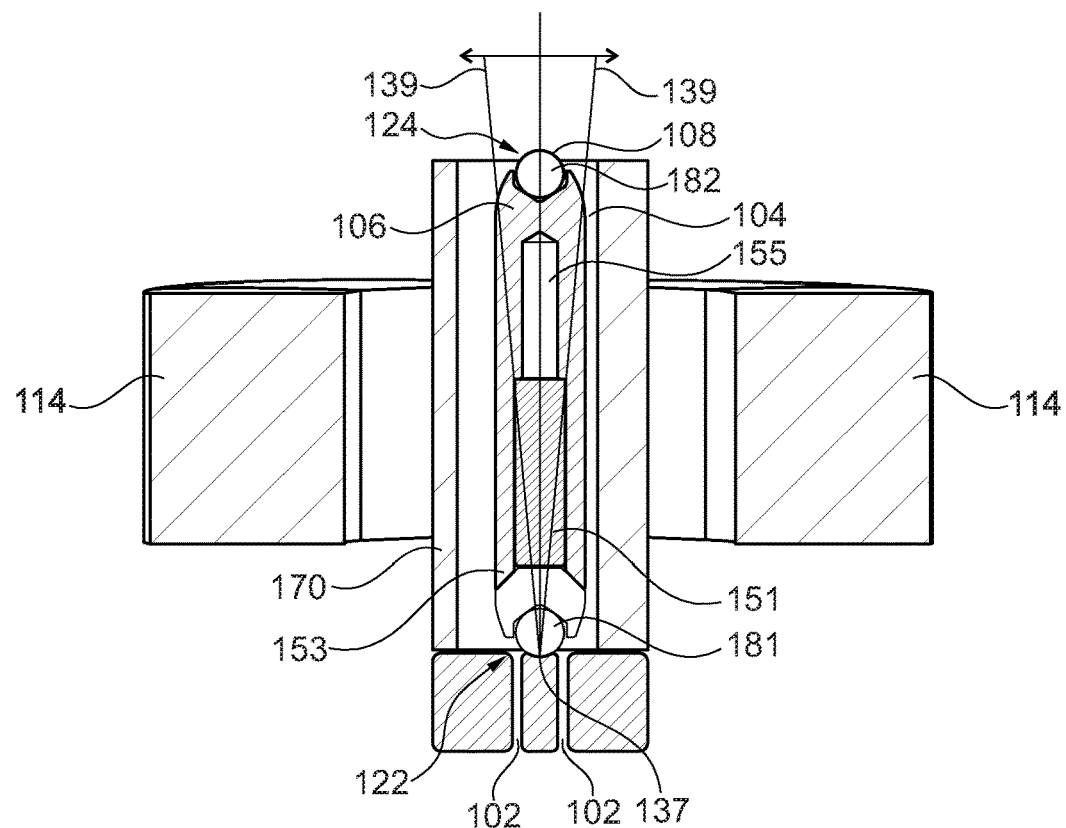
FIG. 16 shows another cross-sectional view of the portion of the mixer illustrated in FIG. 12.
Figure 17:
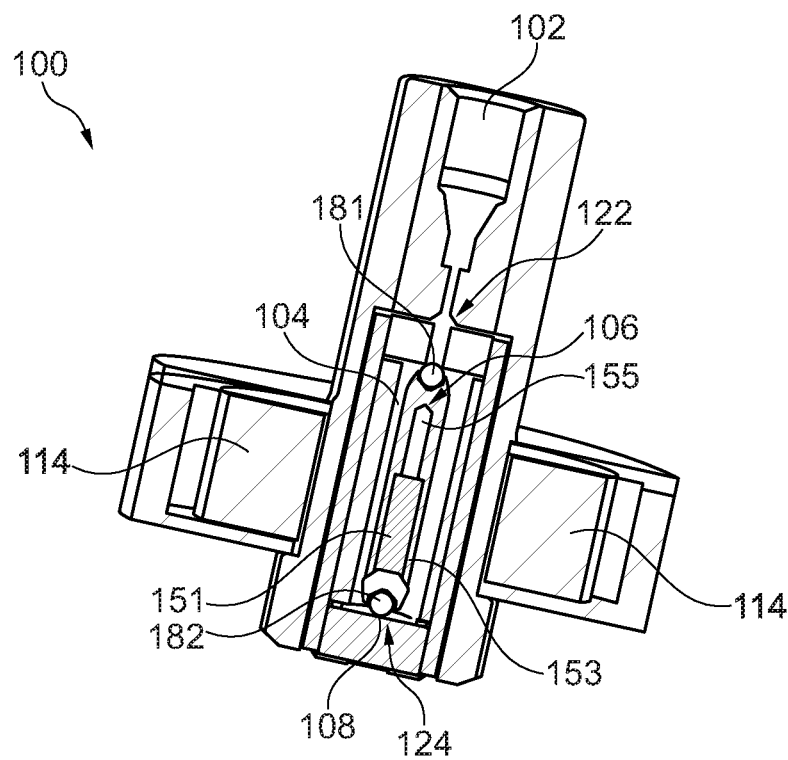
FIG. 17 shows a cross-sectional view of a mixer including the portion shown in FIG. 12 to FIG. 16 according to an exemplary embodiment of the invention.

FIG. 12, FIG. 13 and FIG. 14 show three-dimensional views and FIG. 15 and FIG. 16 show cross-sectional views of a portion of a mixer 100 according to still another exemplary embodiment of the invention with a nutation-based mixing architecture. FIG. 17 shows a cross-sectional view of a mixer 100 including the portion shown in FIG. 12 to FIG. 16.

As shown for instance in FIG. 12, the magnetic drive unit 114 is created by three magnetic coils 114a, 114b, 114c arranged circumferentially to surround movable body 106 and radial bearing 170. As seen best in FIG. 16 and illustrated with reference numeral 139, this may promote tilting of movable body 106 in addition to its rotation and reciprocation. More generally, at least two magnetic coils may be implemented to trigger the tilting motion of the movable body 106. Still referring to FIG. 16, for properly defining said tilting or tumbling motion of the movable body 106 (which may be combined with an axial motion and a rotation motion, as described above), valve ball 181 may be accommodated in a spherical seat as a ball bearing 137. The tilting nutation-type tumbling of the piston-shaped movable body 106 may then be used for further promoting mixing of the mobile phase. Descriptively speaking, the additional degree of freedom involved by promoting tilting of the movable body 106 provides for a more homogeneous mixing by promoting different types of volume relocation of the mobile phase. The tilting motion may be promoted by the ball bearing 137. If the valve is closed, the sealing seat in connection with the conical ball receipt of movable body 106 may already provide a bearing promoting tilting. With the shown configuration, a particularly controlled tumbling or pivoting of the piston shaped movable body 106 may be accomplished.

Figure 18:
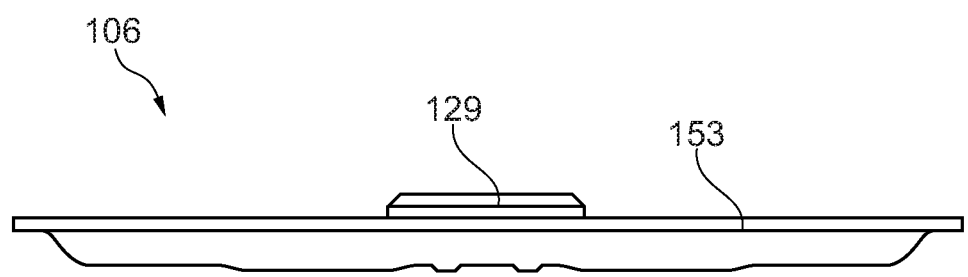
FIG. 18 shows a view of a movable body configured as a mixing disk of a mixer according to an exemplary embodiment of the invention.
Figure 19:
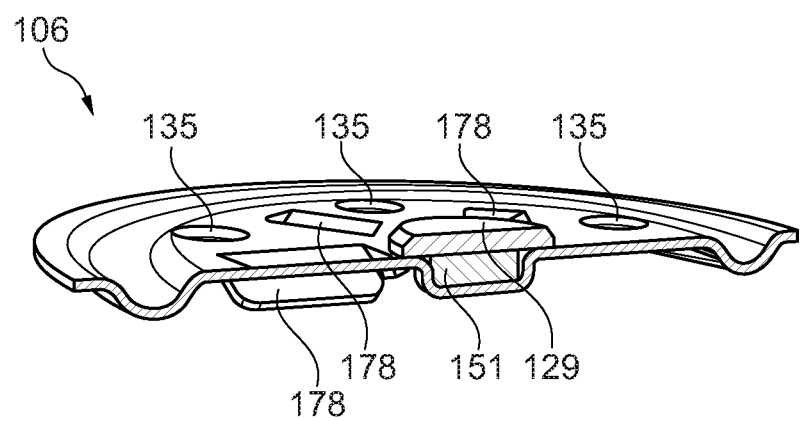
FIG. 19 shows a different view of the movable body illustrated in FIG. 18.
Figure 20:
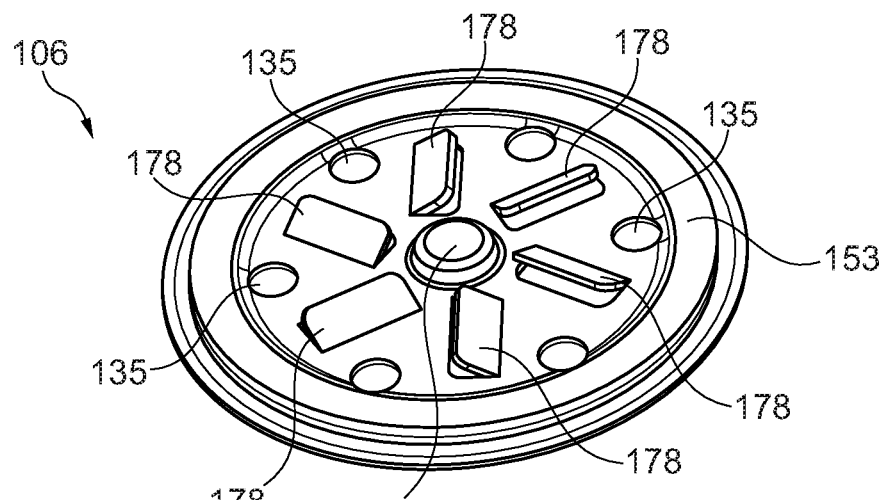
FIG. 20 shows another different view of the movable body illustrated in FIG. 18.

FIG. 18, FIG. 19 and FIG. 20 show different views of a movable body 106 configured as a mixing disk of a mixer 100 according to an exemplary embodiment of the invention.

The disk-shaped movable body 106 according to FIG. 18 to FIG. 20 comprises through-hole defining guide blades 178 for promoting mixing of mobile phase and optionally for driving movable body 106, and comprises additional through holes 135 for additionally promoting mixing of mobile phase by triggering turbulence. A flat portion of movable body 106 may be made of non-magnetic material 153. Magnetic material 151 (for instance a ferromagnet or another kind of magnet) may be embedded in the central region of the disk-shaped movable body 106. After inserting magnetic material 151 into a recess in the non-magnetic material 153, the magnetic material 151 may be covered with a lid 129.

A magnetic pulse field may be applied in a direction perpendicular to the disk plane of movable body 106. This may result in a motion of the movable body 106 in such a direction. Additionally, a rotating magnetic field may be created for rotation type mixing of fluid. Optionally, by implementing a pole change, tilting of the disk-shaped movable body 106 may be triggered as well.

Alternatively, it is also possible to manufacture the entire movable body 106 according to FIG. 18 to FIG. 20 from a magnetic (in particular ferromagnetic) material, which may then be coated for passivating it with respect to the mobile phase.

Figure 21:
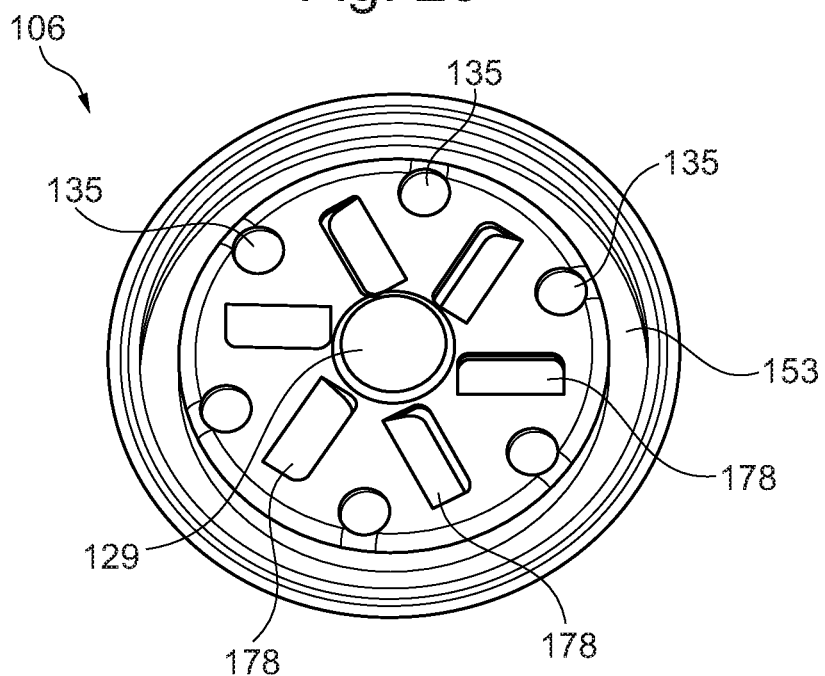
FIG. 21 shows a view of a movable body configured as a mixing disk with valve ball of a mixer according to another exemplary embodiment of the invention.
Figure 22:
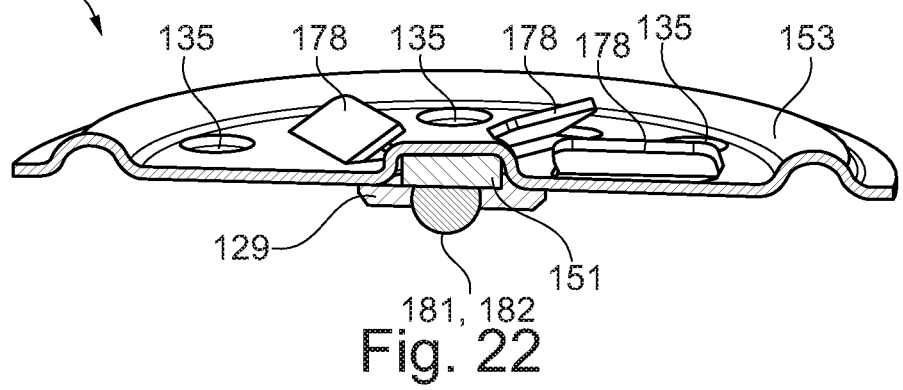
FIG. 22 shows a different view of the movable body illustrated in FIG. 21.

FIG. 21 and FIG. 22 show different views of a movable body 106 configured as a mixing disk with valve ball 181 of a mixer 100 according to another exemplary embodiment of the invention.

The embodiment of FIG. 21 and FIG. 22 differs from the embodiment of FIG. 18 to FIG. 20 in that a valve ball 181 or 182 is attached to the movable body 106 according to FIG. 21 and FIG. 22 for providing a valve function. The seat of valve ball 181, 182 may be fixed (for instance spherical) or may be conical.

Figure 23:
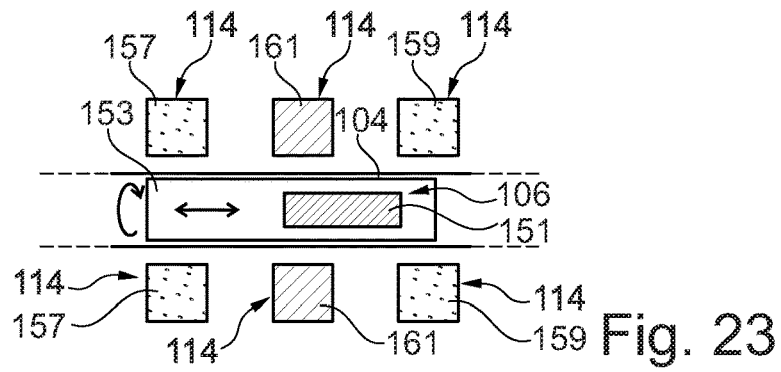
FIG. 23 illustrates a magnetic drive unit for driving a movable body with magnetic material according to an exemplary embodiment.

FIG. 23 illustrates a magnetic drive unit 114 for driving a movable body 106 with magnetic material 151 according to an exemplary embodiment.

FIG. 23 illustrates a first coil 157, a second coil 159 and a permanent magnet 161 in between the first coil 157 and the second coil 159 in a longitudinal direction. A movable body 106 may be located in a space enclosed by the circumferential or annular structures 157, 159, 161. Applying an appropriate current signal to the coils 157, 159 may result in a combined rotation and reciprocating motion of the movable body 106 in a mixing volume 104.

Figure 24:
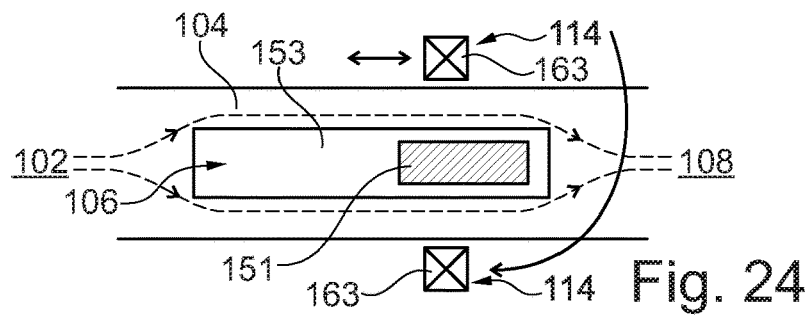
FIG. 24 is a schematic view of a flow of mobile phase through a mixing volume accommodating a movable body of a magnetically driven mixer according to an exemplary embodiment.

FIG. 24 is a schematic view of a flow of mobile phase through a mixing volume accommodating a movable body 106 of a magnetically driven mixer 100 according to an exemplary embodiment.

FIG. 24 illustrates how the mobile phase is split upstream of movable body 106, flows around the lateral surface of the movable body 106 and is then combined to a continuous flow at fluid outlet 108. Furthermore, FIG. 24 shows a coil 163 surrounding the mixing volume 104. FIG. 24 also shows that magnetic material 151 may be embedded within a non-magnetic shell of non-magnetic material 153 of the movable body 106. According to FIG. 24, the movable body 106 is shaped as rod or oblong circular cylinder.

Figure 25:
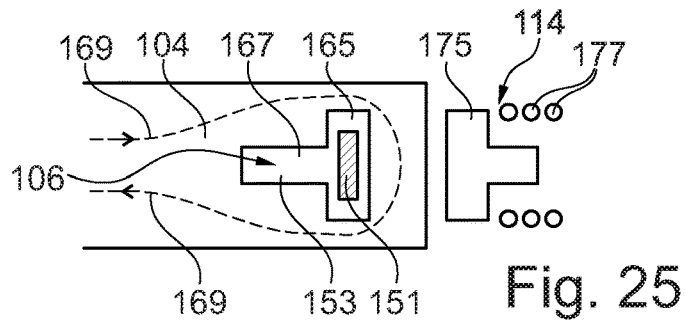
FIG. 25 shows a mixer configuration according to another exemplary embodiment in which the movable body has rod-shaped portion and a disk-shaped portion with magnetic material embedded therein.

FIG. 25 shows a mixer 100 according to another exemplary embodiment in which the movable body 106 has a disk-shaped portion 165 with magnetic material 151 embedded therein. More precisely, the movable body 106 comprises a rod portion 167 and disk portion 165. The magnetic material 151 is embedded in the disk portion 165. A flow path of mobile phase being mixed by mixer 100 is illustrated with reference numeral 169 in FIG. 25 as well. The mobile phase flows around the movable body 106. A permanent magnet 175 is movable by a coil 177, so that a generated magnetic force may move the movable body 106 within the mixing volume 104.

FIG. 26 is a plan view of a disk-shaped movable body 106 with guide blades 178 according to another exemplary embodiment of a mixer 100. FIG. 27 illustrates a cross-sectional view of the movable body 106 according to FIG. 26 together with valve components and a drive unit 114.

Referring to FIG. 26, disk-shaped movable body 106 is illustrated having a plurality of guide blades 178 on a flange face of the disk-shaped movable body 106. Mobile phase flowing around movable body 106 may trigger rotation of the movable body 106 by a corresponding rotation force. In other words, when the disk-shaped movable body 106 is axially moving forwardly and backwardly, mobile phase exerting a force on the guide blades 178 may trigger a rotation of the movable body 108.

The cross-sectional view of the movable body 106 according to FIG. 27 shows that the non-magnetic shell of non-magnetic material 153 can be composed of two half shells 171, 173. The magnetic material 151 is embedded in an interior thereof. As can be taken from FIG. 27 as well, one or more sphere segments 179 may be formed on the flange face of the movable body 106 so as to be seatable in a sealed way in a seat 193 of a valve component of the corresponding mixer-valve-arrangement. Furthermore, a magnetic body 195 is shown in FIG. 27 which may accomplish driving of the movable body 106 by generating a magnetic force.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:
1. A valve for mixing a mobile phase in a sample separation device for separating a fluidic sample, the valve comprising:
  a fluid inlet for supplying the mobile phase to be mixed to
    a mixing volume;

a movable body configured to rotate and axially move in the mixing volume to thereby mix the mobile phase, wherein the movable body is disposed in the mixing volume without being attached to the valve; and a fluid outlet for supplying the mixed mobile phase to a mobile phase consumer, wherein the movable body is configured to selectively open or close a flow path of mobile phase through the fluid inlet, along the mixing volume and through the fluid outlet, and comprising at least one of the following features:

wherein the movable body is configured to selectively open or close the flow path by being actuated by an axial movement;

wherein the movable body is configured to be actuated by the mobile phase.

2. The valve according to claim 1, wherein the movable body comprises at least one of the following: a substantially rotationally symmetric body; a cylinder body; a disk body; and a combined cylinder-disk body.

3. The valve according to claim 1, wherein at least part of a surface of the movable body or a radial bearing surrounding the movable body and delimiting the mixing volume comprises a structured surface configured to promote mixing the mobile phase when interacting with the mobile phase.

4. The valve according to claim 1, wherein the movable body is at least partially made of a magnetic material so as to be rotatable and axially movable by a magnetic drive force.

5. The valve according to claim 4, wherein the magnetic material of the movable body is embedded in non-magnetic material of the movable body.

6. The valve according to claim 4, comprising a magnetic drive unit configured to exert a magnetic force to the movable body so as to rotate and axially move the movable body.

7. The valve according to claim 1, wherein the fluid inlet comprises a fluid splitter configured to split the supplied mobile phase to flow around the movable body to thereby promote mixing.

8. The valve according to claim 7, wherein the fluid outlet comprises a fluid combiner configured to combine the mixed split mobile phase to a combined stream flowing out through the fluid outlet.

9. The valve according to claim 1, comprising a feedback channel configured to feed the mobile phase after mixing in the mixing volume back towards the fluid inlet or back to an additional fluid outlet.

10. The valve according to claim 1, comprising at least one of: an inlet ball valve comprising an inlet ball and a corresponding ball seat at the fluid inlet; an outlet ball valve comprising an outlet ball and a corresponding ball seat at the fluid outlet.

11. The valve according to claim 10, wherein at least one of the inlet ball or the outlet ball is actuable by the movable body to promote cleaning of the inlet ball or the outlet ball by pressing the inlet ball or the outlet ball in a corresponding ball seat and by simultaneously rotating the movable body when in contact with the inlet ball or the outlet ball.

12. The valve according to claim 10, comprising at least one of the following features:

wherein at least one of the inlet ball or the outlet ball is fixedly connected with the movable body;

wherein at least one of the inlet ball or the outlet ball is provided separately from the movable body;

wherein at least one of the inlet ball or the outlet ball is movable in an axial direction by the movable body;

wherein at least one of the inlet ball or the outlet ball is movable in an axial direction by wherein at least one of the inlet ball or the outlet ball is movable in an axial direction by the mobile phase;

wherein at least one of the inlet ball or the outlet ball is configured to cooperate with a conical seat of the movable body;

wherein at least one of the inlet ball or the outlet ball is configured to cooperate with a spherical seat of the movable body.

13. The valve according to claim 1, comprising at least one of the following features:

comprising at least one guide blade on at least one of the movable body or a radial bearing surrounding the movable body and delimiting the mixing volume, wherein the at least one guide blade is configured for interacting with the mobile phase for promoting mixing of the mobile phase and/or for being rotated by the mobile phase as a result of an interaction between the mobile phase and the at least one guide blade when the movable body is axially moving;

wherein the movable body is configured to carry out a nutational movement or to pivot around an axial direction between the fluid inlet and the fluid outlet;

wherein the movable body is arranged in the mixing volume in such a manner that the mobile phase flows around a lateral surface of the movable body between at least part of a path between the fluid inlet and the fluid outlet;

wherein the movable body is configured to rotate around an axis of axial movement;

wherein the movable body is configured to axially move by reciprocating along an axis of axial movement.

14. A mobile phase supply device for providing a mobile phase, the mobile phase supply device comprising:

the valve according to claim 1 for receiving and mixing one or more solvents; and a drive unit configured for receiving the mixed one or more solvents from the valve and for pressurizing the received one or more solvents to be provided as the mobile phase.

15. The mobile phase supply device according to claim 14, wherein the valve is configured as an active inlet valve arranged upstream of the drive unit.

16. A sample separation device for separating a fluidic sample, the sample separation device comprising:

a drive unit for driving a mobile phase and the fluidic sample when injected in the mobile phase;

the valve according to claim 1 for mixing the mobile phase before injecting the fluidic sample in the mobile phase; and a sample separation unit configured for separating the fluidic sample in the mobile phase.

17. The sample separation device according to claim 16, further comprising at least one of the following features:

wherein the valve is located upstream of the drive unit;

wherein the valve is located downstream from the drive unit;

the sample separation device is configured as a chromatography sample separation device;

the sample separation device comprises an injector configured to inject the fluidic sample in the mobile phase;

the sample separation device comprises a detector configured to detect separated fractions of the fluidic sample;

the sample separation device comprises a fractioner unit configured to collect separated fractions of the fluidic sample;

the sample separation device comprises a degassing apparatus configured to degas the mobile phase.

18. The valve according to claim 1, wherein the movable body is configured to rotate and/or axially move in the mixing volume in response to non-contacting actuation by a drive unit.

19. The valve according to claim 1, wherein the movable body configured to rotate and axially move in the mixing volume such that rotation and axial movement of the movable body are independent of each other.

20. The valve according to claim 1, wherein the movable body configured to rotate and axially move in the mixing volume simultaneously or sequentially.

* * * * *